US012508177B2

(12) United States Patent
Spanton et al.

(10) Patent No.: US 12,508,177 B2
(45) Date of Patent: Dec. 30, 2025

(54) TRANSPORT APPARATUS FOR A PERSON AND METHOD

(71) Applicants: John Michael Spanton, Seal Beach, CA (US); Anna Loree Spanton, Dana Point, CA (US)

(72) Inventors: John Michael Spanton, Seal Beach, CA (US); Anna Loree Spanton, Dana Point, CA (US); Scott O. Ganaja, San Luis Obispo, CA (US)

(73) Assignees: John Michael Spanton, Seal Beach, CA (US); Anna Loree Spanton, Dana Point, CA (US)

( * ) Notice: Subject to any disclaimer, the term of this patent is extended or adjusted under 35 U.S.C. 154(b) by 1463 days.

(21) Appl. No.: 16/795,397

(22) Filed: Feb. 19, 2020

(65) Prior Publication Data

US 2020/0306111 A1 Oct. 1, 2020

Related U.S. Application Data

(63) Continuation-in-part of application No. PCT/US2019/064798, filed on Dec. 5, 2019.

(Continued)

(51) Int. Cl.
*A61G 1/003* (2006.01)
*A61G 1/044* (2006.01)

(52) U.S. Cl.
CPC ............ *A61G 1/003* (2013.01); *A61G 1/044* (2013.01); *A61G 2203/12* (2013.01); *A61G 2203/70* (2013.01)

(58) Field of Classification Search
CPC ...... A61G 1/003; A61G 1/044; A61G 7/1032; A61G 2203/12; A61G 2203/70
See application file for complete search history.

(56) References Cited

U.S. PATENT DOCUMENTS 2,397,092 A * 3/1946 Drexler .................. A61G 7/015 5/616
6,486,792 B1 * 11/2002 Moster .................. A61G 7/018 5/503.1

(Continued)

FOREIGN PATENT DOCUMENTS

CA 2619335 A1 * 7/2009 ........... A61G 7/1015
DE 202013102928 U1 * 12/2013 ................ B25F 5/00
WO 2016029507 A1 3/2016

OTHER PUBLICATIONS

Angulo, Conveyor Rescue Technology for EMS, Oct. 10, 2014, Fire Apparatus & Emergency Equipment. https://www.fireapparatusmagazine.com/ems/conveyor-rescue-technology-for-ems/#gref (Year: 2014).*

*Primary Examiner* — David R Hare
*Assistant Examiner* — Amanda L Bailey
(74) *Attorney, Agent, or Firm* — Fredrikson & Byron, P.A.

(57) ABSTRACT

Disclosed is an apparatus and method for transporting a person from a position on the ground onto the apparatus generally in a horizontal orientation. The apparatus comprises a board assembly upon which the person is positioned lengthwise in a horizontal orientation. The board assembly includes a belt housing for at least one endless belt, and a battery powered drive system for rotating the belt. A hand-held, portable, external, detachable controller has a motor coupling that enables the battery powered drive system to be detachably connected to a battery within the controller. A coupling connector manually connected and disconnected to the drive system enables the coupling connector to engage and operate the drive system.

25 Claims, 31 Drawing Sheets

Related U.S. Application Data

(60) Provisional application No. 62/903,263, filed on Sep. 20, 2019, provisional application No. 62/776,375, filed on Dec. 6, 2018.

(56) References Cited

U.S. PATENT DOCUMENTS

| | | | | |
|---|---|---|---|---|
| 6,910,677 | B1 | 6/2005 | Miller et al. | |
| 6,981,745 | B2 * | 1/2006 | Rees | A61G 5/14 297/217.3 |
| 7,047,578 | B2 | 5/2006 | Spanton | |
| 7,200,881 | B2 * | 4/2007 | Kasagami | A61G 7/1036 5/81.1 R |
| 2001/0013437 | A1 * | 8/2001 | Husted | A61G 5/1089 180/68.5 |
| 2003/0009115 | A1 | 1/2003 | Sherman | |
| 2003/0106153 | A1 | 6/2003 | Myers | |
| 2004/0244108 | A1 * | 12/2004 | Spanton | A61G 1/003 5/81.1 R |
| 2007/0056095 | A1 | 3/2007 | Scordato et al. | |
| 2009/0000035 | A1 * | 1/2009 | Awerbuch | A61G 1/013 5/627 |
| 2009/0107773 | A1 * | 4/2009 | Notheis | A47F 9/04 198/816 |
| 2010/0146704 | A1 | 6/2010 | Barthelt | |
| 2010/0178981 | A1 | 7/2010 | Holcomb | |
| 2011/0218384 | A1 | 9/2011 | Bachman et al. | |
| 2012/0304386 | A1 * | 12/2012 | Koh | A61G 7/103 5/626 |
| 2014/0373273 | A1 | 12/2014 | Hillenbrand, II et al. | |
| 2016/0158082 | A1 * | 6/2016 | Gainor | A61B 6/107 5/690 |
| 2017/0266069 | A1 | 9/2017 | Lozano et al. | |
| 2017/0340498 | A1 * | 11/2017 | Tessmer | A61G 13/104 |
| 2018/0021191 | A1 * | 1/2018 | Lambarth | A61G 5/047 296/20 |
| 2021/0121342 | A1 * | 4/2021 | Girardin | A61G 1/0293 |

* cited by examiner

18a
R
E2

G2
GS
E1
E3

CR
G2
GS
E1
6C
E2
CC
R
23
B
18a
SW

S2
RS2
P2
G4

G3
P1
RS1

TRANSPORT APPARATUS FOR A PERSON AND METHOD

INCORPORATION BY REFERENCE

This is a U.S. non-provisional patent application that claims priority based on our pending PCT application PCT/US2019/064798, filed Dec. 5, 2019, which incorporated by reference U.S. Provisional Patent Application No. 62/776,375, filed Dec. 6, 2018, and U.S. Provisional Patent Application No. 62/903,263, filed Sep. 20, 2019. These related non-provisional and provisional utility patent applications are incorporated herein by reference and made a part of this application. If any conflict arises between the disclosure of the invention in this PCT application and that in these related provisional utility patent applications, the disclosure in this PCT application shall govern. Moreover, any and all U.S. patents, U.S. patent applications, and other documents, hard copy or electronic, cited or referred to in this application are incorporated herein by reference and made a part of this application.

DEFINITIONS

The words “comprising,” “having,” “containing,” “holding,” and “including,” and other grammatical forms thereof, are intended to be equivalent in meaning and be open ended in that an item or items following any one of these words is not meant to be an exhaustive listing of such item or items, nor meant to be limited to only the listed item or items.

The word “cable” means any flexible and elongated cord or like device employing one or multiple strands of electrically conductive material.

Background

An apparatus for transporting the sick or injured is typically referred to as a stretcher or gurney. Such a sick or injured person if not properly transported may have their condition exacerbated. U.S. Patent No. 7,02,578 (herein the ’578 Patent) addresses this problem, disclosing an apparatus for transport a person from a position on the ground onto a transport apparatus generally in a horizontal orientation. Our apparatus and method is an improvement in the apparatus disclosed in the ’578 Patent attached as Exhibit A.

Summary

Briefly, our transport apparatus is an improvement in the transport apparatus disclosed in the ’578 Patent where the improvement includes, but is not limited to, using a lightweight, hand-held, portable, external, detachable controller including an external, removable battery. A cable extends outward from a compact, box-type housing of the controller. The housing is configured to retain the external battery until manually removed. Optionally, the controller may include a motor for a drive system of the apparatus. The prior art typically encloses this motor within the apparatus itself.

Our apparatus for transporting a person and method have one or more of the features depicted in the embodiment discussed in the section entitled “DETAILED DESCRIPTION OF SOME ILLUSTRATIVE EMBODIMENTS.” These features are not listed in any rank order nor is this list intended to be exhaustive. The claims that follow define our apparatus and method, distinguishing them from the prior art; however, without limiting the scope of our apparatus and method as expressed by these claims, in general terms, some, but not necessarily all, of their features are:

One, our apparatus enables a user to transport a person from a horizontal and longitudinal orientation lying on the ground onto our apparatus generally in the same horizontal and longitudinal orientation.

Two, our apparatus includes a board assembly upon which the person is positioned in the horizontal and longitudinal orientation and a hand-held, portable, external controller. The board assembly has a housing supporting a drive belt assembly comprising a drive system for rotating at least one endless belt that moves over an exterior support surface of the housing to support the person being moved onto the apparatus. The board assembly and controller are configured to be connected together and disconnected to electrically couple and decouple a battery within the controller to a drive motor for the drive belt assembly.

Three, the drive system and adjustable alignment mechanism are mechanically coupled together to control tension in the belt and configured to set, interact and maintain centering of the belt as the belt advances along its path. The adjustable alignment mechanism includes an adjustment mechanism that enables a user from time to time make manual adjustments in the tension and tracking of the belt.

Four, our apparatus has one or more safety devices that prevents operation of the apparatus until the safety device is disabled.

Five, the controller for our transporting apparatus includes a body configured to have an internal container section and an external handle positioned to be grasped and held with one hand by a user. The container section is adapted to hold a battery and circuit board to which are attached electrical circuit components of a control circuit for our apparatus. The control circuit includes a power switch, a forward and reverse switch, and on one part of the handle a trigger switch and on another part of the handle an off lock switch. At least a portion of these switches project from the body and are manually operable by a user depressing these portions.

Our method of transporting a person from a position on the ground onto an apparatus generally in a horizontal orientation, comprises the steps of:

(a) aligning the apparatus lengthwise with a person to be transported lying lengthwise on the ground in a generally horizontal orientation,
(b) placing an end of the apparatus adjacent to the head or feet of said person,
(c) providing a hand-held, portable, external, detachable controller including a battery that powers a motor for the drive system,
(d) manually coupling the battery to the motor and manually actuating the controller to operate the motor, advancing the apparatus towards said person and moving said person onto the apparatus, and
(e) discontinuing actuation of the controller to stop the operation of the motor when the person is on the apparatus in a generally horizontal orientation.

The apparatus has a weight less than 100 pounds not including the weight of the detachable controller. The controller has a weight less than 12 pounds not including battery weight. The motor may be within a belt housing, or the motor may be within the controller. When the motor is within the controller, the weight of the apparatus is less than 65 pounds. With a person on the apparatus, the operation of the motor is reversed to unload said person.

DESCRIPTION OF THE DRAWINGS

Our apparatus for transport a person and method are discussed in detail in connection with the accompanying drawings, which are for illustrative purposes only. These drawings include the following figures (FIGS.), with like numerals and letters indicating like parts:

FIG. 21 is a perspective view of a back end of another embodiment of our transport apparatus with its exterior sides in place.

FIG. 22 is a perspective view of the transport apparatus shown in FIG. 21 with the sides of its belt housing removed to expose its pulley-mounted belts of the apparatus' drive system.

FIG. 23 is a perspective view of the transport apparatus shown in FIG. 21 with housing components removed to show the tensioning and tracking system.

FIG. 24 is a right-handed perspective view of the gearbox used in the transport apparatus shown in FIG. 21.

FIG. 25 is a left-handed perspective view of the gearbox shown in FIG. 21.

FIG. 26 is a perspective view of the forward end of the chain pulley side of the transport apparatus shown in FIG. 21 with its sidewalls in place.

FIG. 27 is a perspective view of the back end of the transport apparatus shown in FIG. 21 similar to that of FIG. 25 with its sidewalls removed.

FIG. 28 is a perspective view of the side opposite the chain pulley side of the transport apparatus shown in FIG. 21 with its sidewall removed.

FIG. 29 is a perspective end view of a tracking adjustment mechanism used in the transport apparatus shown in FIG. 21.

FIG. 30 is a perspective view of the forward end of the transport apparatus shown in FIG. 21 including a tension adjustment mechanism used in the transport apparatus shown in 8 FIG. 21.

FIG. 31 is a perspective view of a component of the tensioning and tracking mechanism used in the transport apparatus shown in FIG. 21.

DETAILED DESCRIPTION OF SOME ILLUSTRATIVE EMBODIMENTS

General

Figure 2:
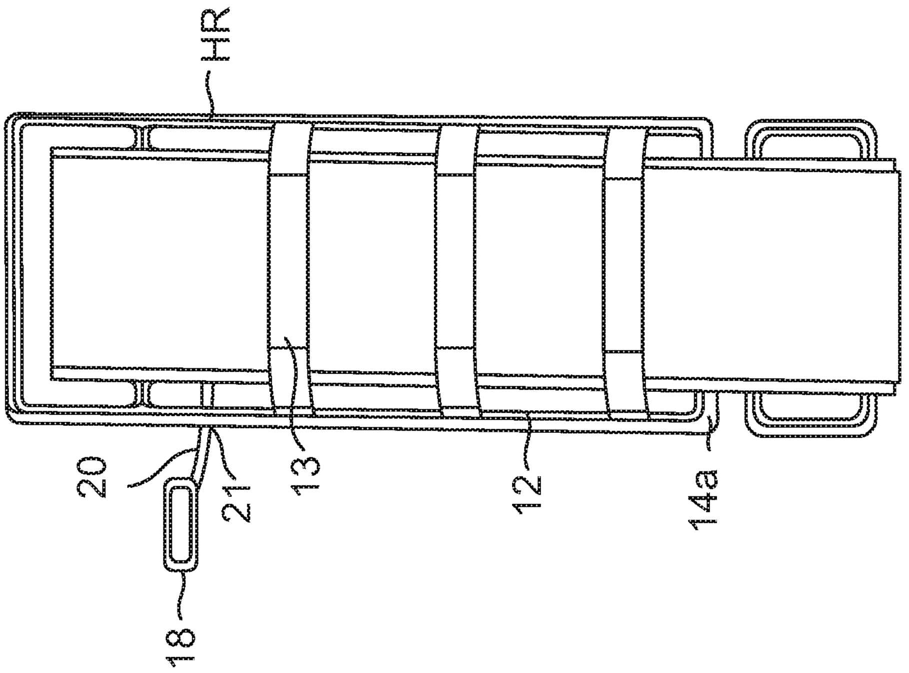
FIG. 2 is a top plan view of the embodiment of our transport apparatus shown in FIG. 1.

There are two embodiments of our apparatus illustrated: One apparatus is designated by the numeral 10 (FIGS. 1 through 5) and the other apparatus by the numeral **10*a*. Both apparatus 10 and 10*a* are designed to transport a person from a position on the ground onto the apparatus generally in a horizontal orientation. Both apparatus 10 and 10*a* comprise a generally rectangular board assembly 12 upon which the person is positioned. This board assembly 12 has predetermined dimensions sufficient to support this person in a horizontal orientation, for example, its width generally ranges from 16 to 28 inches, its length generally ranges from 70 to 84 inches, and its height generally ranges from 0.5 to 10 inches. The board assembly 12 also includes a chassis or belt housing 14 holding two endless belts 14***a* and 14*b*, a drive system DS within the housing, and an external battery B attached to a hand-held, manually portable, external, detachable controller. In the apparatus 10 this controller is designated by 26 the numeral 18 and in the apparatus 10*a* its controller is designated by the numeral 18*a*.

In the apparatus 10 a cable 20 connects the battery B to a motor M that is within the belt housing 14. In the apparatus 10*a* the cable is eliminated and a motor (not shown) is contained within its controller 18*a*. The apparatus has a weight less than 100 pounds not including the weight of the detachable controller. The controller has a weight less than 12 pounds without the battery. The motor may be within a belt housing, or the motor may be within the controller. When the motor is within the controller, the weight of the apparatus is less than 65 pounds.

Figure 27:
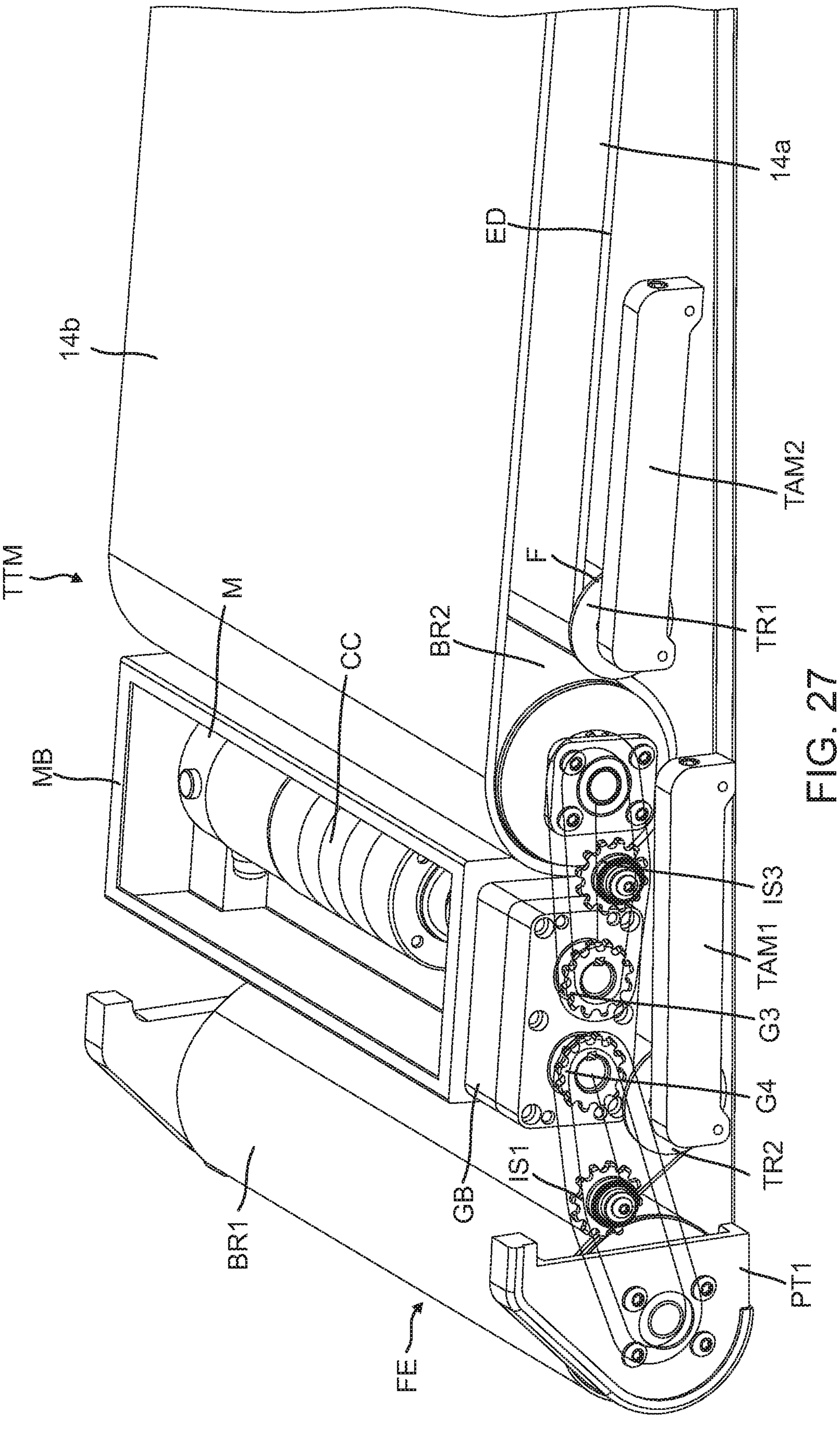
Figure 28:
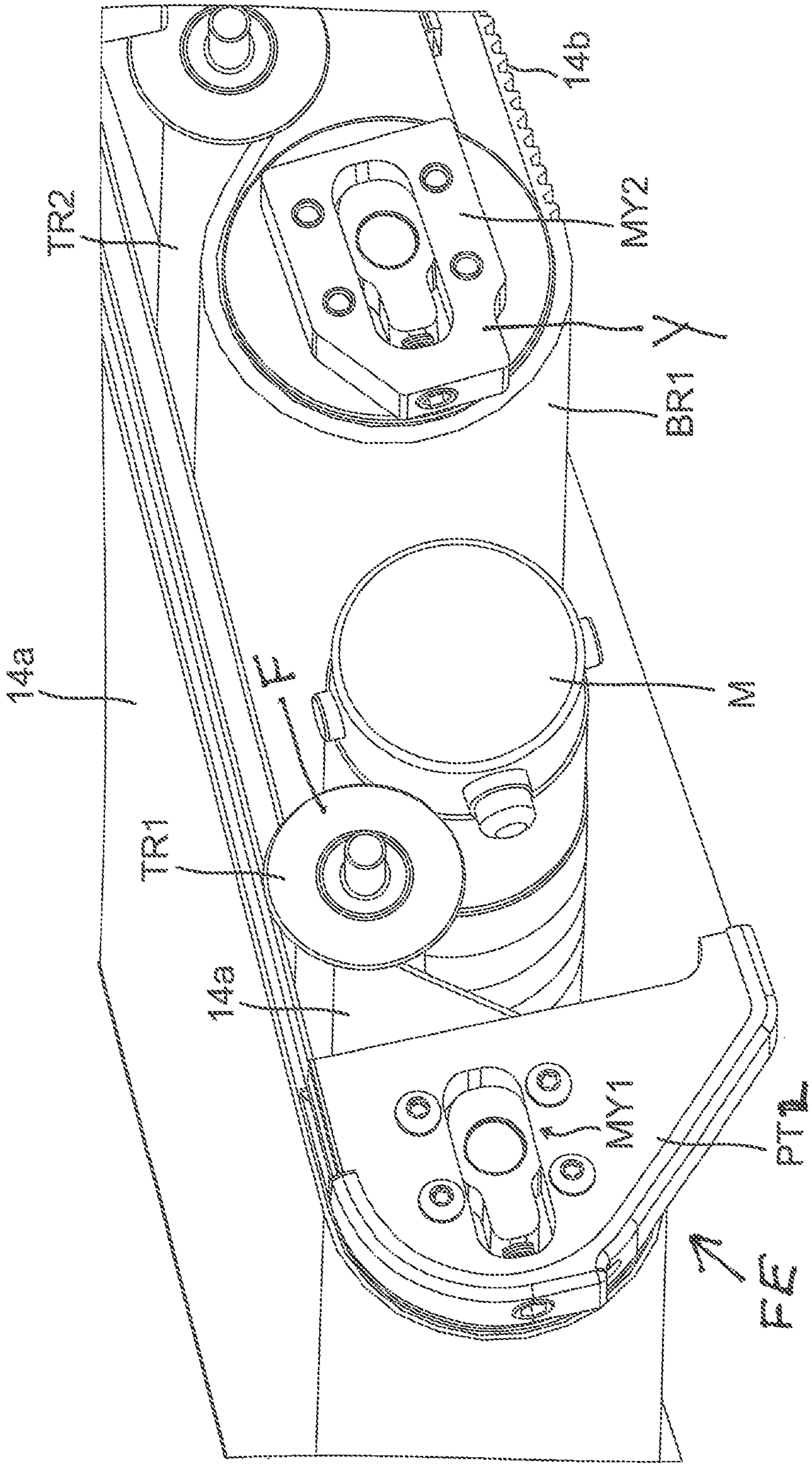

As depicted in FIGS. 15 and 21 through 33, two endless belts 14*a* and 14*b* are coupled together mechanically to the motor M through a coupling connector CC on the motor's drive shaft to rotate the gears G1 through G4 (FIGS. 27 and 28) in a gear box GB. The drive system DS is configured so that the endless belts 14*a* and 14*b* are advanced simultaneously in opposite directions. The battery B powers the motor M, which drives the gears G1 through G4 in the gear box GB. The drive system DS includes a tracking and tensioning system TTS for the belts 14*a* and 14*b* having spaced apart belt rollers BR1 and BR2 and spaced apart tension rollers TR1 and TR2. In the embodiment depicted in FIGS. 6 through 6E the motor (not shown) is within an enclosure 23 of the controller 18*a* of the apparatus 10*a* and is not within the belt housing 14. This substantially reduces the weight of our apparatus. In either case, actuation of its drive motor advances the apparatus 10 or 10*a* towards the person being transported.

Figure 6A:
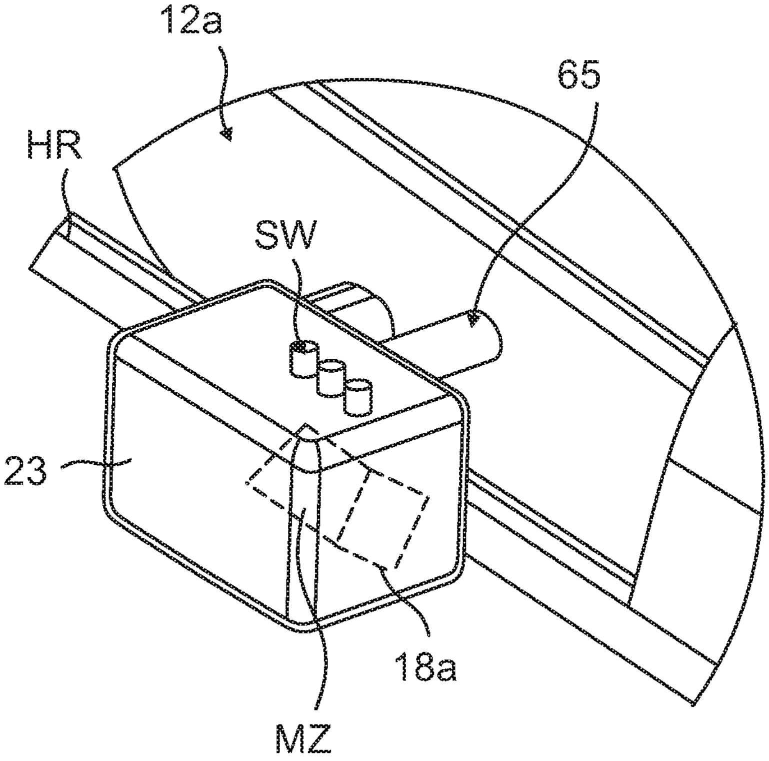
FIG. 6A is an enlarged fragmentary view enclosed within the line 6A of FIG. 6.
Figure 6:
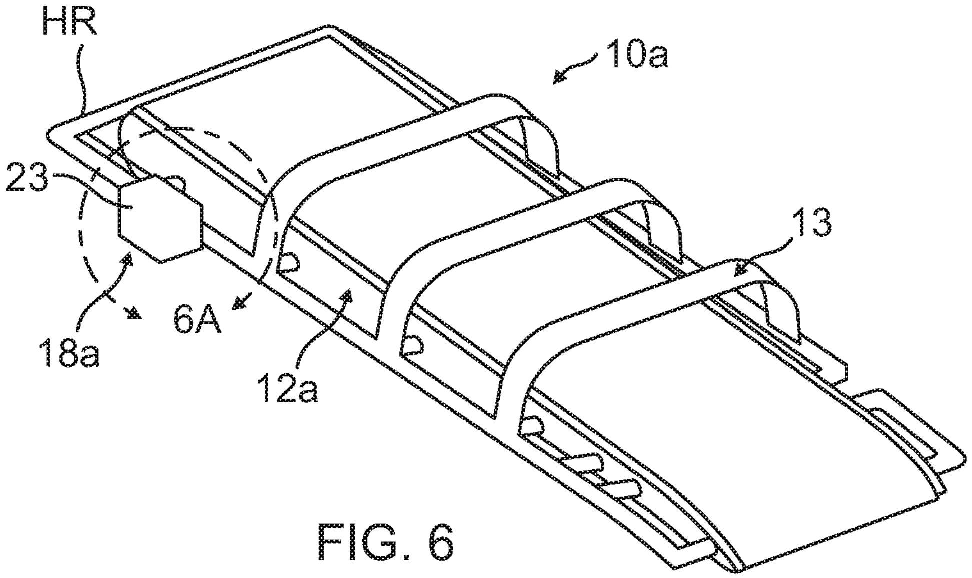
FIG. 6 is a perspective view of another embodiment of our apparatus.
Figures 6B, 6C, 6D, 6E:
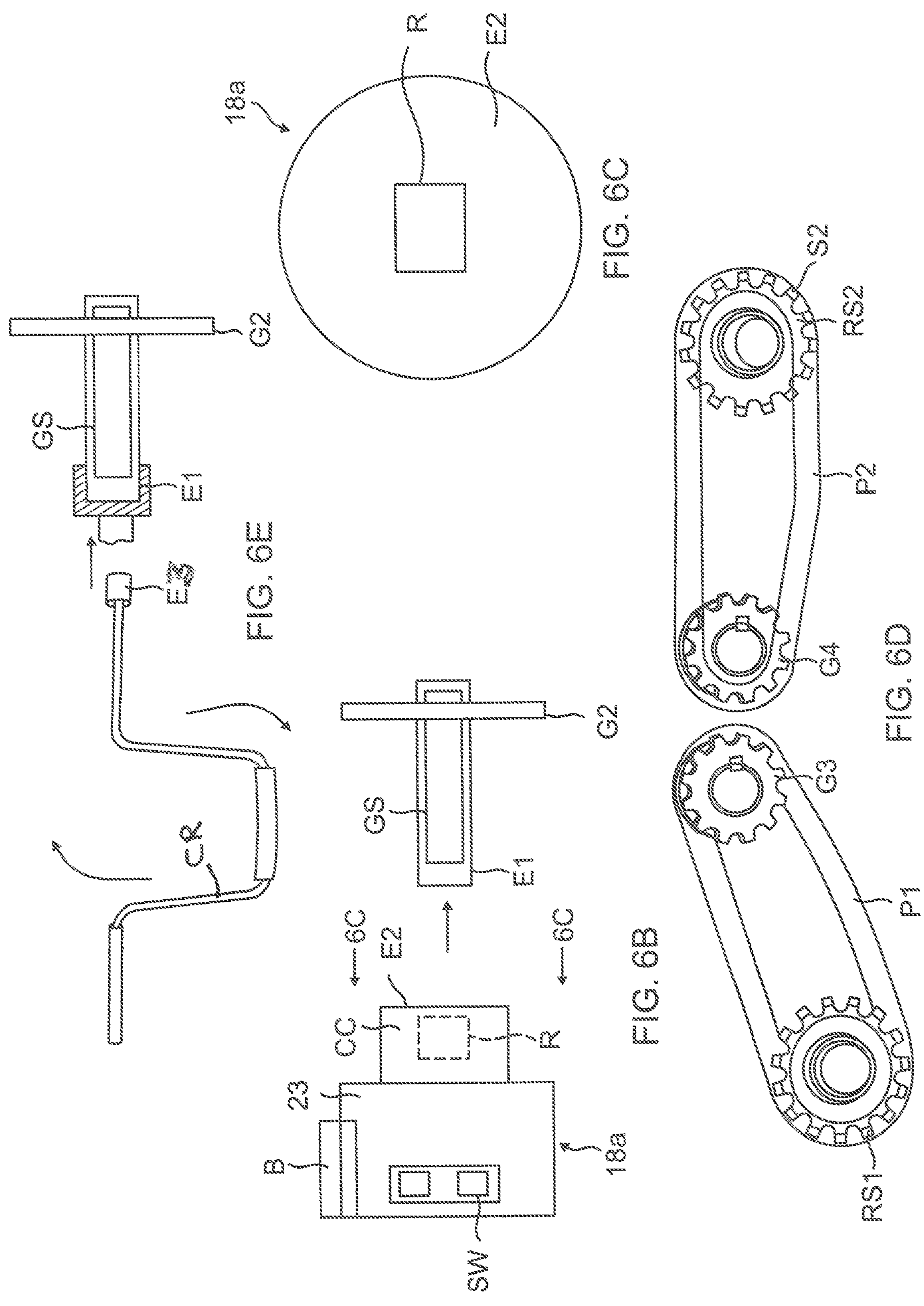
FIG. 6B is an enlarged, fragmentary, exploded side view of the controller aligned with and to be connected to an external portion of a drive axle the drive system.
FIG. 6C is an end view of the controller taken along line 6C-6C of FIG. 6B.
FIG. 6D is an internal view of the apparatus' belt housing illustrating the drive system of our apparatus.
FIG. 6E is an enlarged, fragmentary, exploded side view of a manually operable crank aligned with and then connected to an external portion of a drive axle the drive system.

As best shown in FIG. 6D, there are sprockets S1 and S2 respectively at the ends of the belt rollers BR1 BR2 mounted outboard along the exterior of the belt housing 14. One portion of the chain pulley P1 engages this sprocket S1 and another portion of the chain pulley engages the gear G4 so the chain pulley P1 extends between them so that rotation of the gear G4 causes the chain pulley P1 to rotate clockwise or counter-clockwise depending on the position of the forward and reverse switch SW. Likewise, a portion of the chain pulley P2 engages this sprocket S2 and another portion of the chain pulley engages the gear G3 so the chain pulley P2 extends between them so that rotation of the gear G3 causes the chain pulley P2 to rotate clockwise or counter-clockwise depending on the position of the forward and reverse switch SW. Idler sprockets IS1 and IS2 are mounted to rotate freely and positioned outboard on the exterior of the belt housing 14, respectively engaging intermediate portions of the chain pulleys P1 and P2.

In the embodiment depicted in FIG. 6E, the motor in the controller 18*a* may be operable but the battery B is "dead." In this case a manually operated crank CR is used to actuate our apparatus' drive system DS by manually engaging an end E3 of the crank with a detachable connector element in our transport apparatus and turning the crank.

FIGS. 1 Through 5

Figure 1:
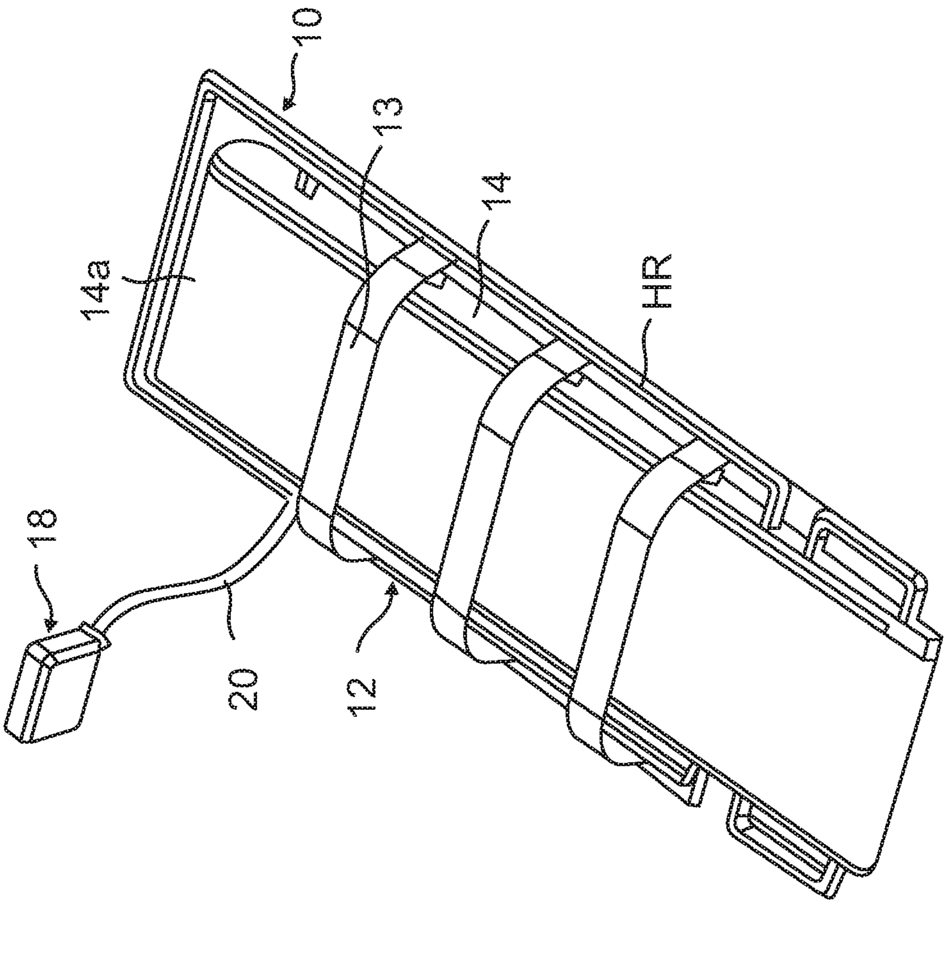
FIG. 1 is a right-hand perspective view of one embodiment of our transport apparatus.
Figure 3:
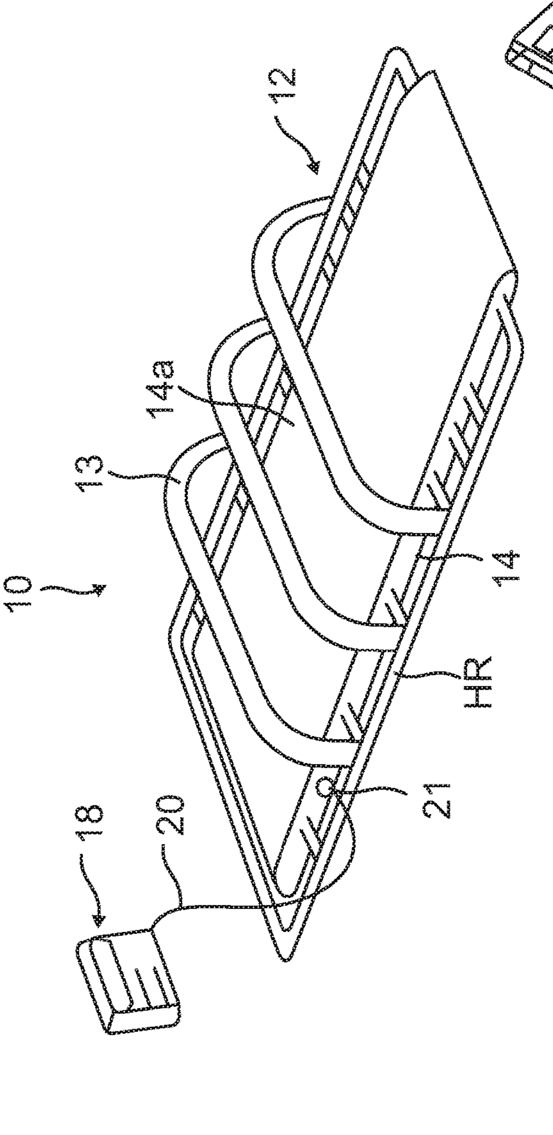
FIG. 3 is a left-hand perspective view of one embodiment of our transport apparatus shown in FIG. 1.
Figure 4:
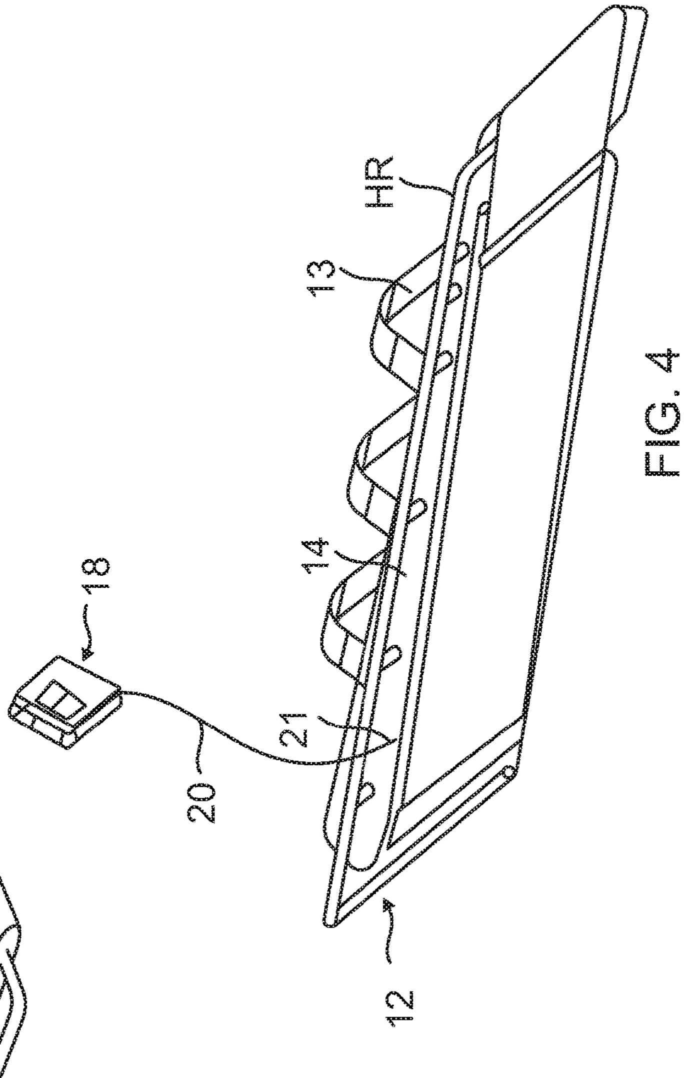
FIG. 4 is a bottom perspective view of the embodiment of our transport apparatus shown in FIG. 1.

As best shown in FIG. 1, our apparatus 10 includes the board assembly 12 including the belt housing 14, the drive system DS, and the detachable, manually portable controller 18 including the external battery B. The dimensions of the board assembly 12 are sufficient to support a typical adult person in a horizontal orientation when positioned on the board assembly 12. For example, the maximum height of the board assembly 12 is 10 inches at the highest end, and its minimum height of 0.5 at the lowest end. Including any handrails HR the board assembly's length is generally from 70 to 84 inches, and its width is generally from 16 to 28 inches. A handrail HR attached to the opposed sides 14 facilitates lifting the apparatus 10 off the ground with the person thereon in a horizontal orientation. Straps 13 may be attached to the sides 14 or handrails HR for holding the person securely on the transport apparatus 10.

Figure 5:
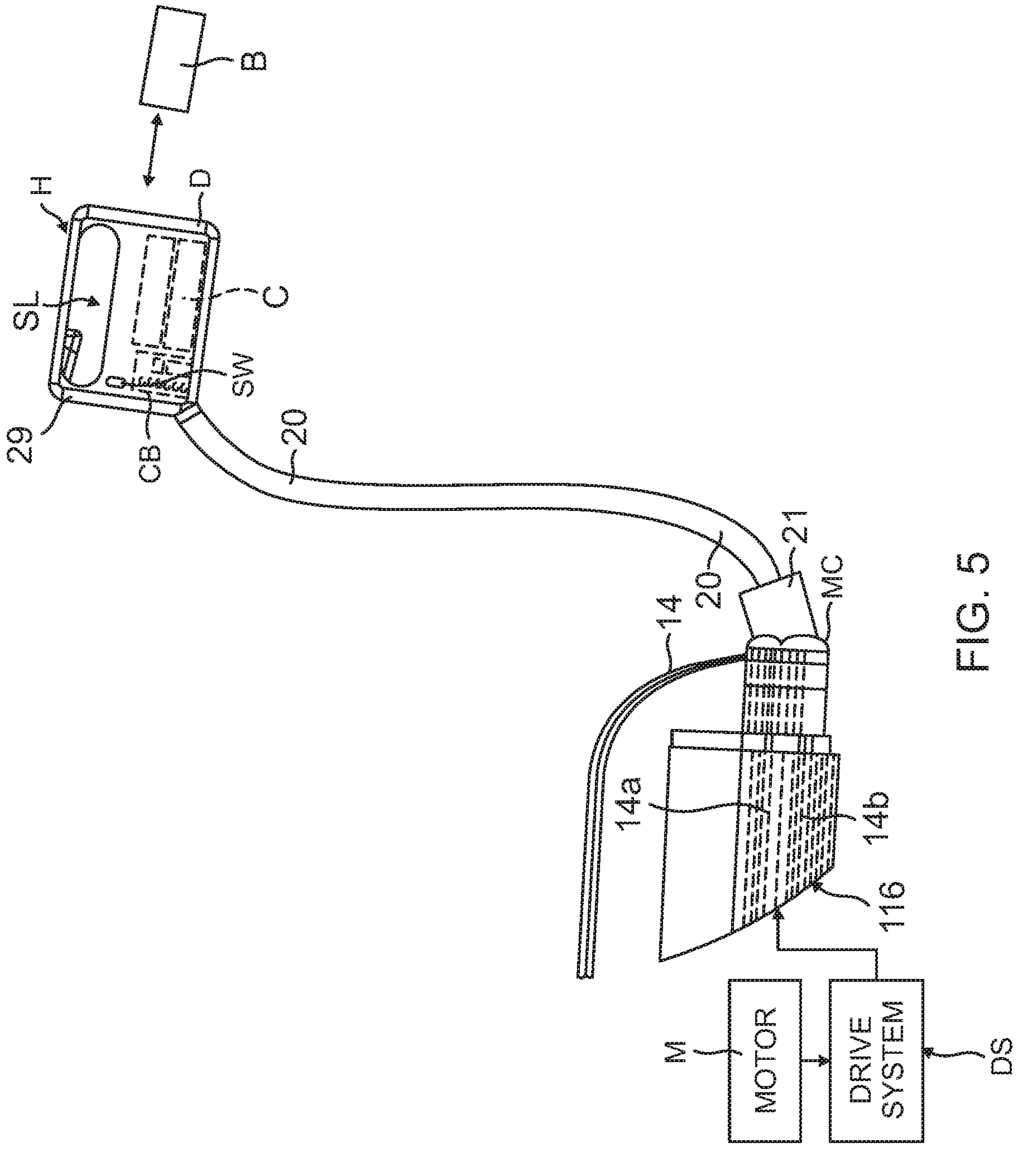
FIG. 5 is a side view of the controller shown in FIGS. 1-4 connected to the drive system for rotating drive belts of our transport apparatus shown in FIG. 1.

As best illustrated in FIG. 5, the belt housing 14 at least partially encloses a pair of endless belts 14*a* and 14*b*. The belt 14*b* is beneath the belt 14*a*, and the person being transported is placed on the exposed top surface S of the belt 14*a* when the transport apparatus 10 is placed on the ground in a horizontal orientation. A drive system DS for the rotating the endless belts 14*a* and 14*b* in opposite directions simultaneously is within the belt housing 14, and it includes a battery powered motor M having a motor coupling MC that enables the motor to be connected to the external battery B in the detachable controller 18 via a flexible cable 20.

The mechanical structure operably connects to the motor M and belts 14*a* and 14*b* so that, with the transport apparatus 10 on the ground and aligned with the person being transported, actuation of the motor advances the apparatus towards the person. The details of the mechanical structure for connecting the motor M to the drive system DS through a gear assembly GA (FIG. 5) within the belt housing 14 are disclosed in the '578 Patent. Upon actuation of the motor M, the belts 14*a* and 14*b* begin to rotate in opposite directions. The belt 14*b* advances the transport apparatus 10 towards a person lying on the ground, with a portion of the belt 14*b* continually engaging the ground to move the entire apparatus 10 towards the person. Concurrently, a forward portion of the belt 14*a* engages the person and moves the person onto the exposed surface S of the belt 14*a*.

The hand-held, portable, external, detachable controller 18 has a cable 20 extending outward from a compact, box-type housing 29 of the controller 18 with limited dimension. The cable 20 terminates in a cable coupling 21 and is configured to be manually connected and disconnected to the motor coupling MC. The dimensions of the housing 29 may be, for example, a height typically from 6 to 12 inches, a length typically from 6 to 8 inches, and a width typically from 4 to 6 inches. The housing 29 is configured to retain the battery B until manually removed. This housing 29 includes an internal compartment 18*b* sized and shaped to hold the battery B. This housing 29 may have a water-tight compartment C with the battery B snugly seated within it. The battery B may have at least a portion extending therefrom, which a user may grasp and removed or insert through a door D in a side of the housing 29, when opened manually, enables a user to replace the battery B as required. The housing 29 also includes a circuit board CB carrying external control circuits for the apparatus 10, a manually actuated forward and reverse switch SW, and a slot SL configured to provide a handle H to allow a user to grasp the controller 18 and, with the cable 20 disconnected, carry the controller from place to place. A trigger T in the handle H is manually depressed to actuate the drive 11 system DS after activating the switch SW. In the reverse mode, a person on our apparatus 10 is unloaded from our apparatus.

FIGS. 6 Through 6E

In the apparatus 10*a* the cable 18 is eliminated, and instead its drive motor (not shown) is contained within its detachable controller 18*a*. The battery B to power the motor is also within detachable controller 18*a*. For example, the coupling connector CC mechanically connects the drive motor to an elongated gear shaft GS of the gear G2, rotating the drive gear G2. Extending from an axial end E1 of the drive gear G2 is a connector element, for example, in the form of an elongated gear shaft GS. At an outer end E2 (FIG. 6B) of the coupling connector CC is a square shaped recess R creating a female cavity. To detachably connect the controller 18*a* to the apparatus 10*a* a detachable connector element is electrically coupled to the battery power motor in the controller 18*a*. In this embodiment, an exposed, square shaped gear shaft GS of the gear G2 functions as a connector element. The square shaped male axial end E1 is manually inserted into the recess R upon the ends E1 and E2 engaging. The rectangular board assembly 12 of our transport apparatus 10*a* has a weight of about 5 pounds less than the board assembly 12 of our transport apparatus 10*a* because of the absence of a motor for the drive system. The coupling connector CC projects from the enclosure 23 of the controller 18*a* and is axially aligned with the end E1 of the shaft extending outward from the gear G2 in this apparatus 10*a*. The user manually seats the coupling connector CC on this end E1 so this end is received within the recess R. Actuation of the motor rotates the gear G2, driving the endless belts 14*a* and 14*b*.

As illustrated in FIG. 6E, when the battery B is "dead" the manually operated crank CR is used to actuate the drive system DS. The end E3 of the crank with a detachable connector element in our transport apparatus.

In this case a manually operated CR is used to actuate the drive system DS by manually engaging an end E3 of the crank with the axial end E1 of the elongated gear shaft GS is inserted into the square shaped recess R to detachably connect the controller 18*a* to the apparatus 10*a*. Rotation of the crank CR rotates the gear G2, manually driving the endless belts 14*a* and 14*b*.

FIGS. 7 Through 12

A third embodiment of our transport apparatus is generally designated by the alpha numeral 10*b* in FIGS. 7 through 12. This apparatus 10*b* includes a safety device SD that prevents operation of the apparatus until the safety device is disabled. This safety device SD comprises a plurality of safety switches SS in series connection through an electric wire E. The individual safety switches SS are each individually connected to a D-ring DR mounted along the sides of the apparatus 10*b*, for example, between the handrail FIR and the sides of the belt housing 14. Each D-ring DR is manually moveable between a down position in FIG. 7C with the safety switch in series connection and an up position in FIG. 7D out of series connection. The switches DR 1 and DR2 are up in FIG. 7A disabling operation of the apparatus 10*b*. All the safety switches DR, including switches DR 1 and DR2, are down in FIG. 7B, enabling the operation of the apparatus 10*b*. 22

Figure 13:
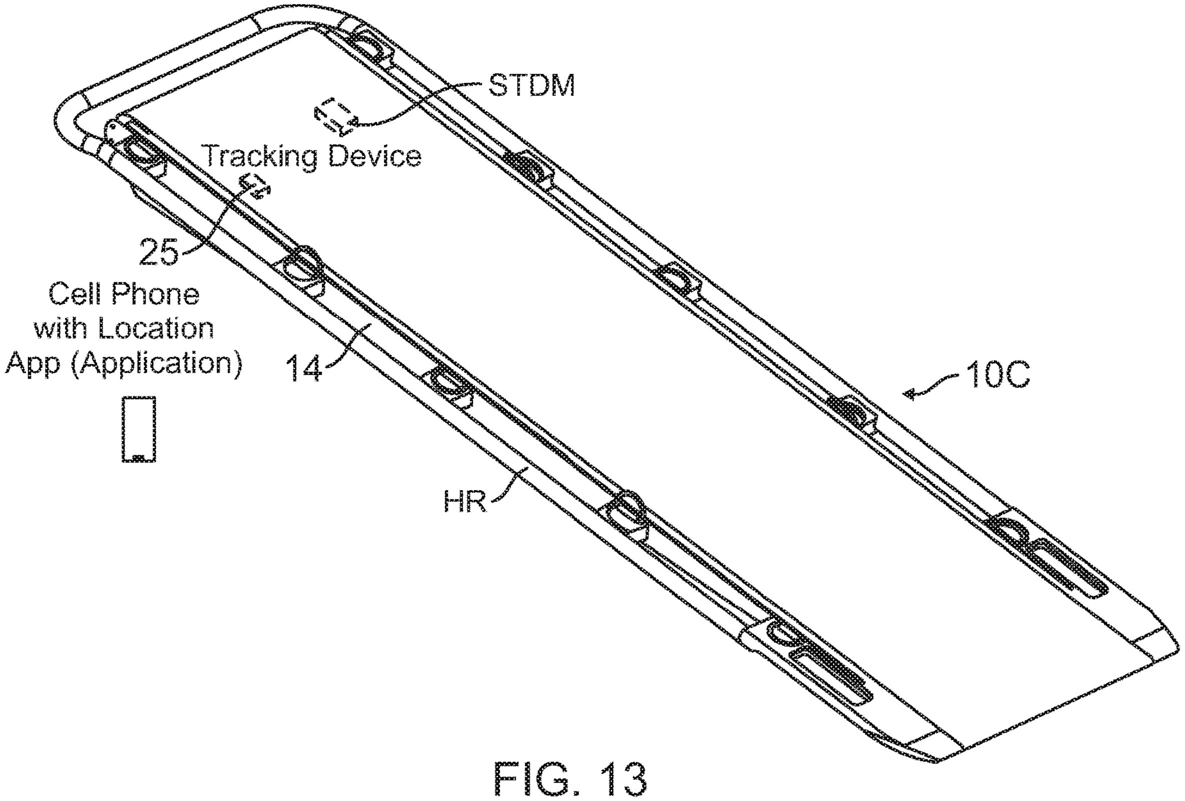
FIG. 13 is a perspective view of a fourth embodiment of our transport apparatus incorporating a locating device to avoid misplacing our apparatus and a smart technology diagnostic module that monitors patient.
Figure 14:
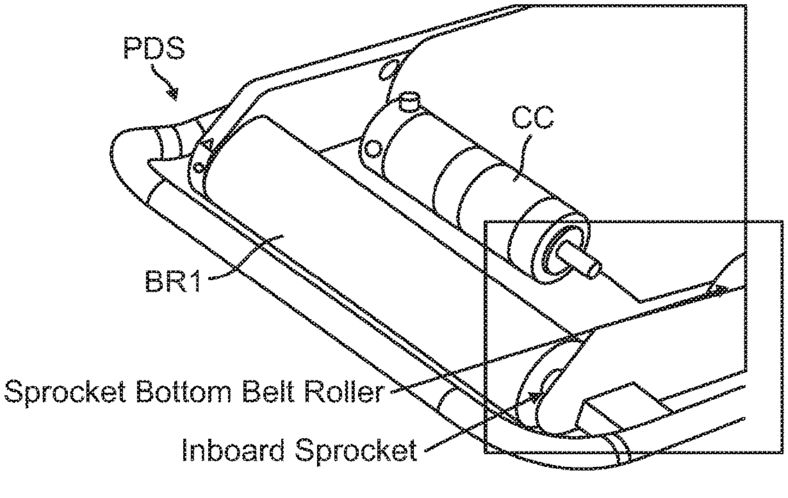
FIG. 14 is a perspective view of a drive pulley system for our transport apparatus shown in FIG. 13.
Figure 15:
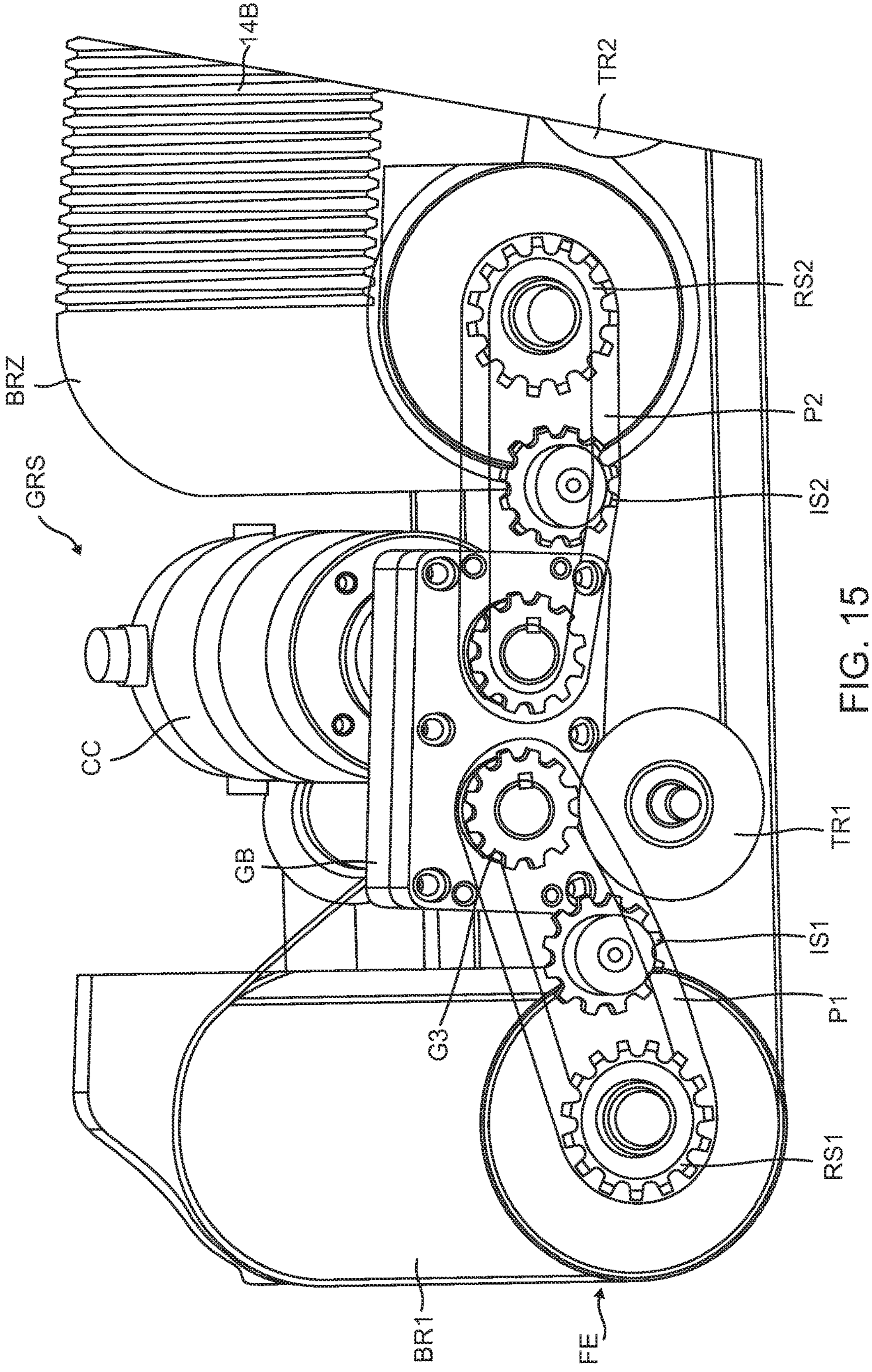
FIG. 15 is a perspective view of a drive system for our transport apparatus shown in FIG. 13.

FIGS. 13 Through 15

A fourth embodiment of our transport apparatus is generally designated by the alpha numeral 10*c* in FIGS. 13 through 15. This apparatus 10*c* includes one or both of: a smart technology diagnostic module STDM that monitors a patient placed on the apparatus and a tracking device 25 that provides a signal for locating a misplaced one of the apparatus 10*c*. The tracking device 25 is interactive with a mobile device such as an iPhone equipped with an application program for locating the tracking device. The smart technology diagnostic module STDM and the tracking device 25 may be enclosed within a housing for the motor.

FIGS. 14 and 15 also show an embodiment of our transport apparatus employing a drive pulley system PDS (FIG. 14) including a transmission gear system GRS (FIG. 15) enclosed within the belt housing 14. Chain tensioners may also be employed so that chain drive pulleys P1 and P2 may be more closely synchronized as discussed in greater detail in connection with FIGS. 21 through 31.

FIGS. 16 Through 20

Figure 7A:
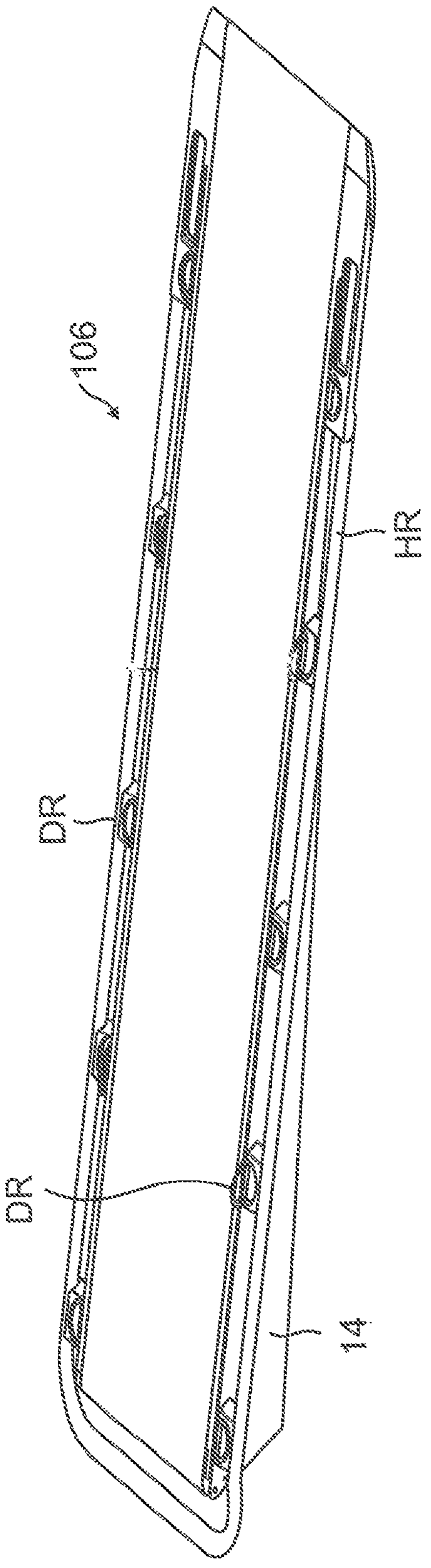
FIG. 7A is a perspective view of a third embodiment of our transport apparatus incorporating a safety device disabling the apparatus to avoid false starts. 17
Figure 7D:
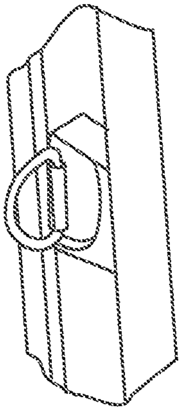
FIG. 7D is a fragmentary perspective view similar to FIG. 7C illustrating the D-ring in an up position to open the circuit, disabling operation of our transport apparatus shown in FIG. 7A.
Figure 7C:
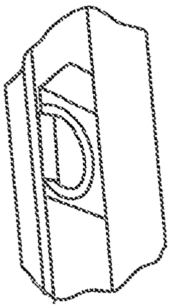
FIG. 7C is a fragmentary perspective view illustrating a D-ring in a down position; multiple switches in series connection to provide a circuit enabling the safety device of our transport apparatus shown in FIG. 7 with all in down closed position.
Figure 7B:
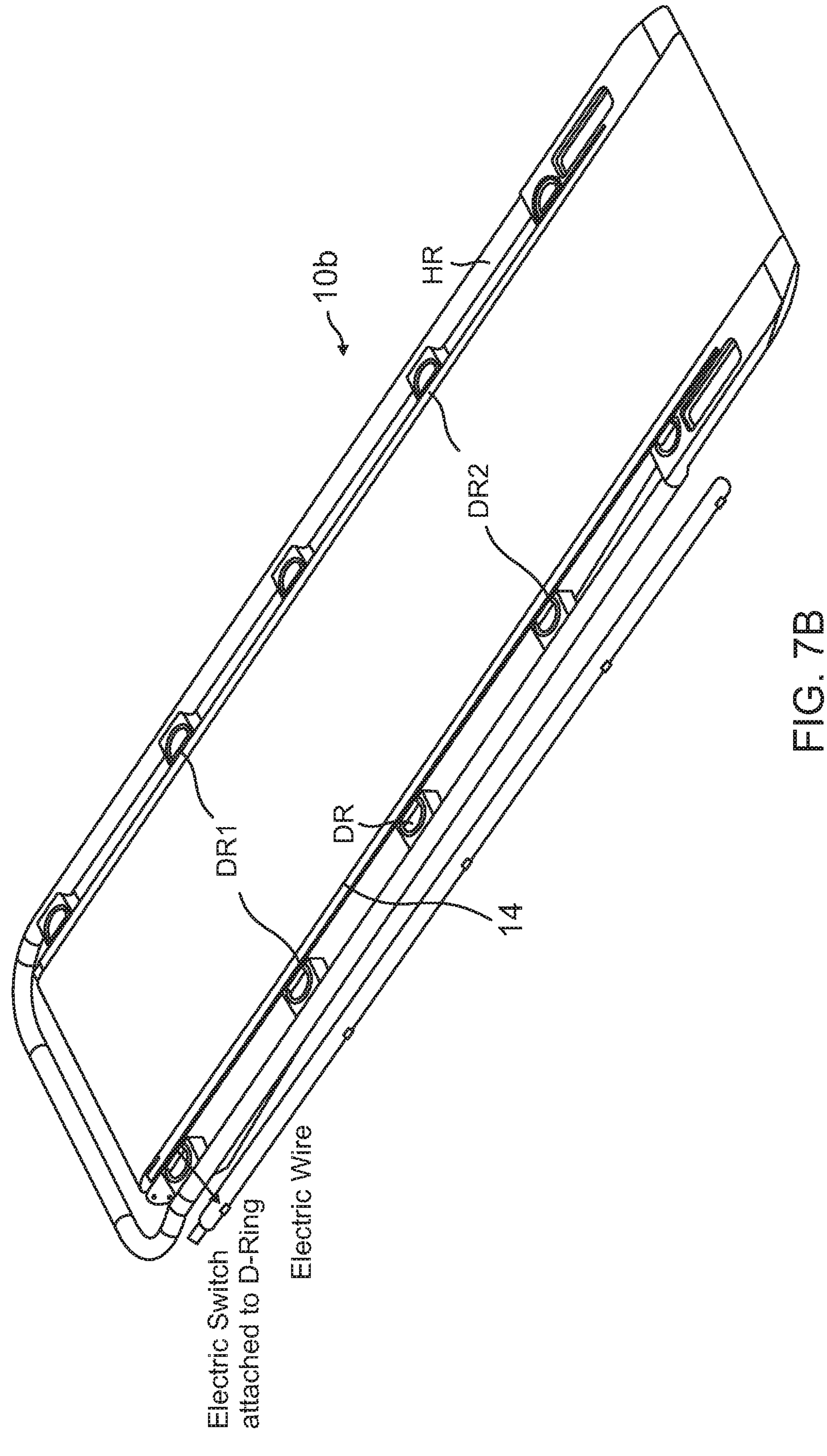
FIG. 7B is a perspective view similar to FIG. 7A showing the safety device engaged to enable operation of our apparatus.
Figure 8:
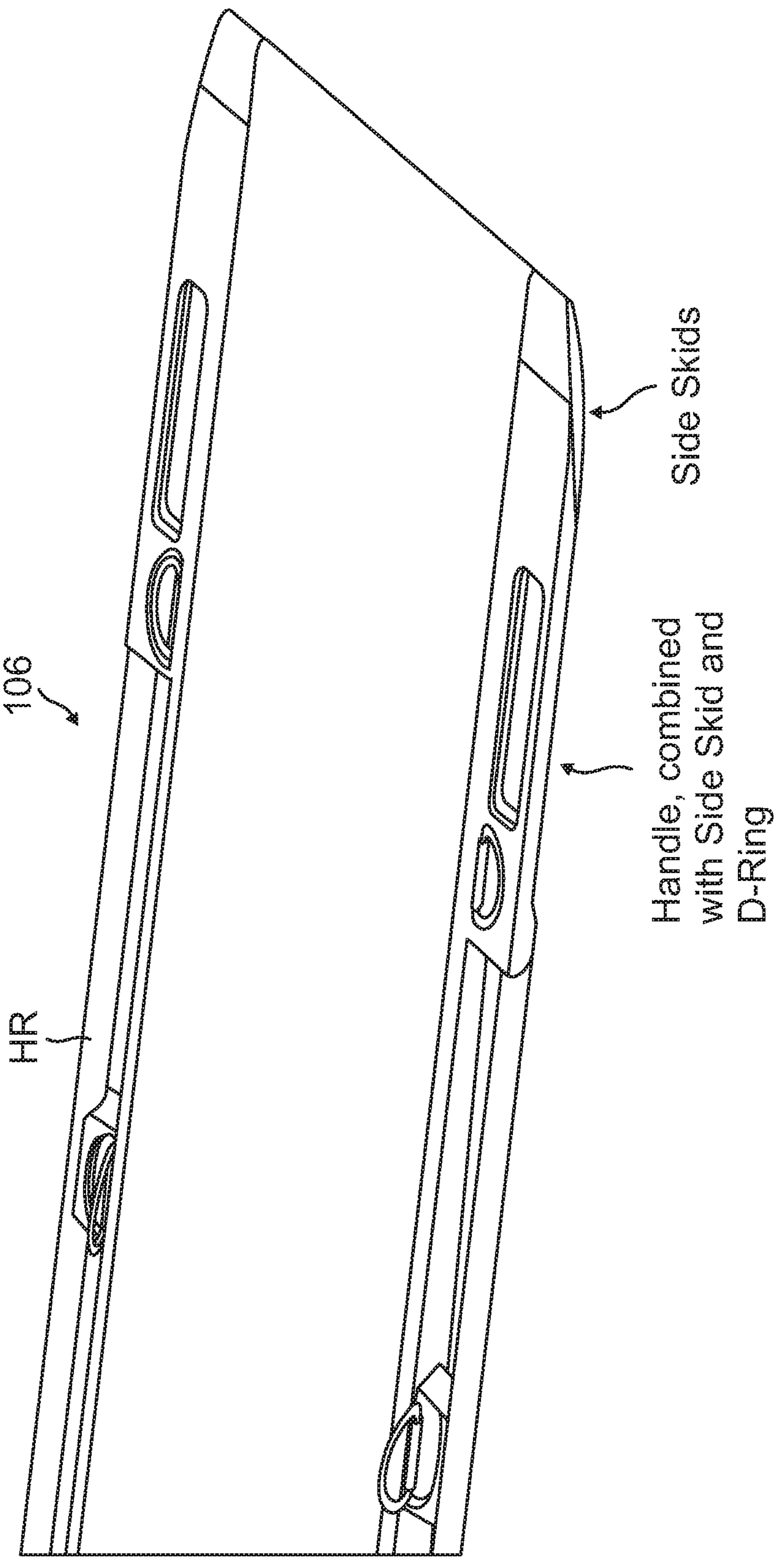
FIG. 8 is an enlarged, fragmentary, perspective end portion view of the embodiment of our transport apparatus shown in FIG. 7A.
Figure 9:
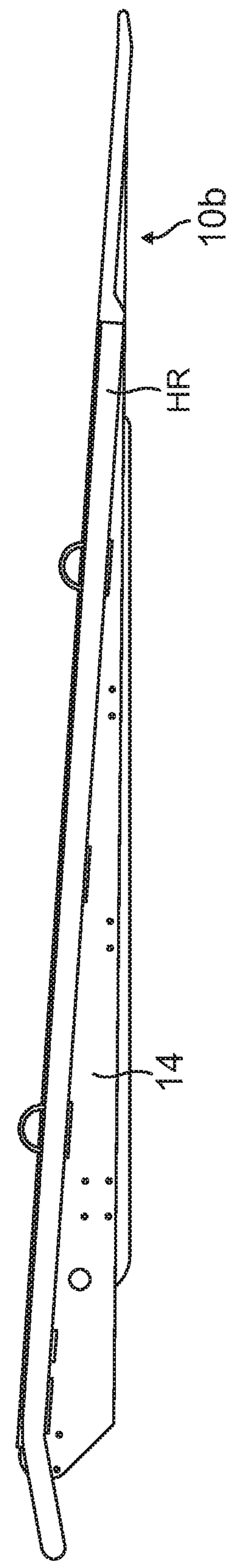
FIG. 9 is a side view of the embodiment of our transport apparatus shown in FIG. 7A.
Figure 10:
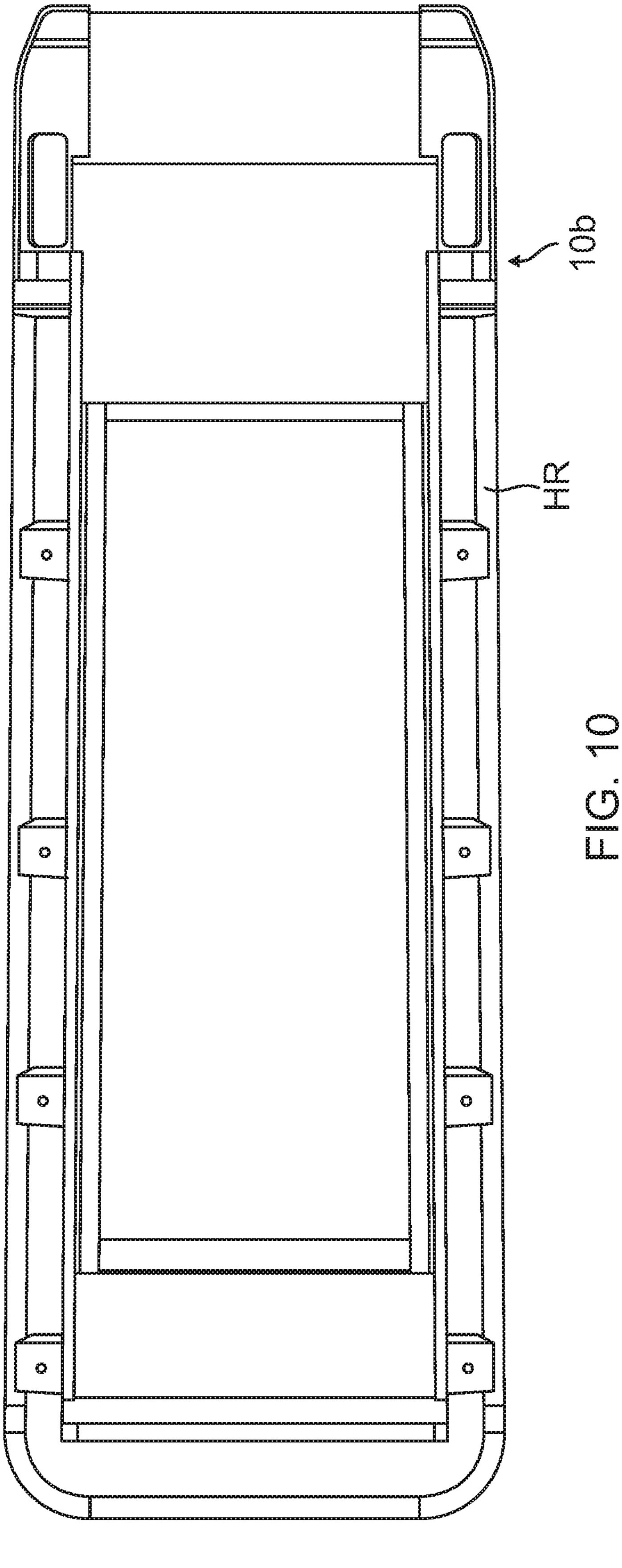
FIG. 10 is a bottom view of the embodiment of our transport apparatus shown in FIG. 7.
Figure 11A:
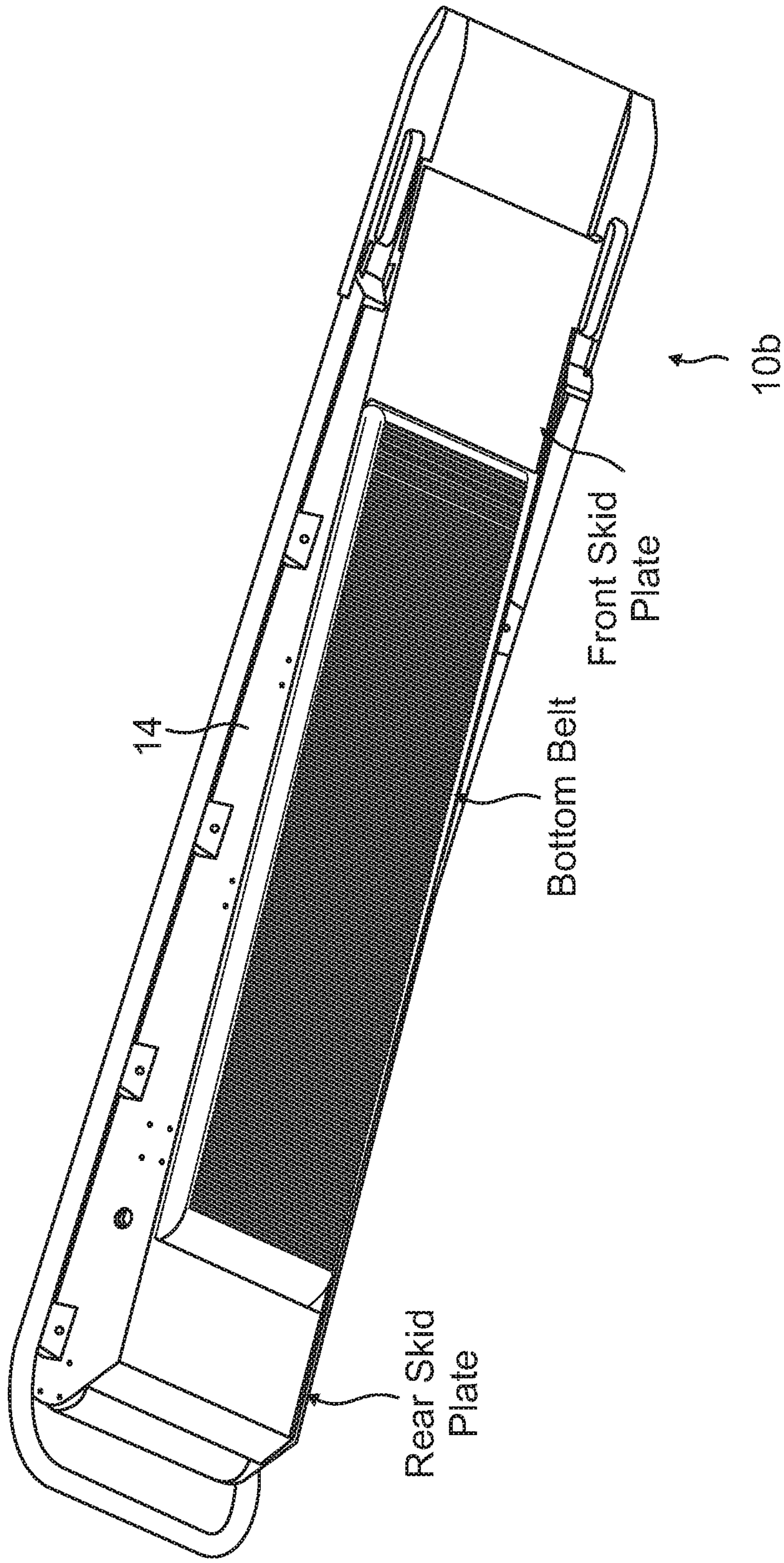
FIG. 11A is a perspective bottom view of the embodiment of our transport apparatus shown in FIG. 7A.
Figure 11B:
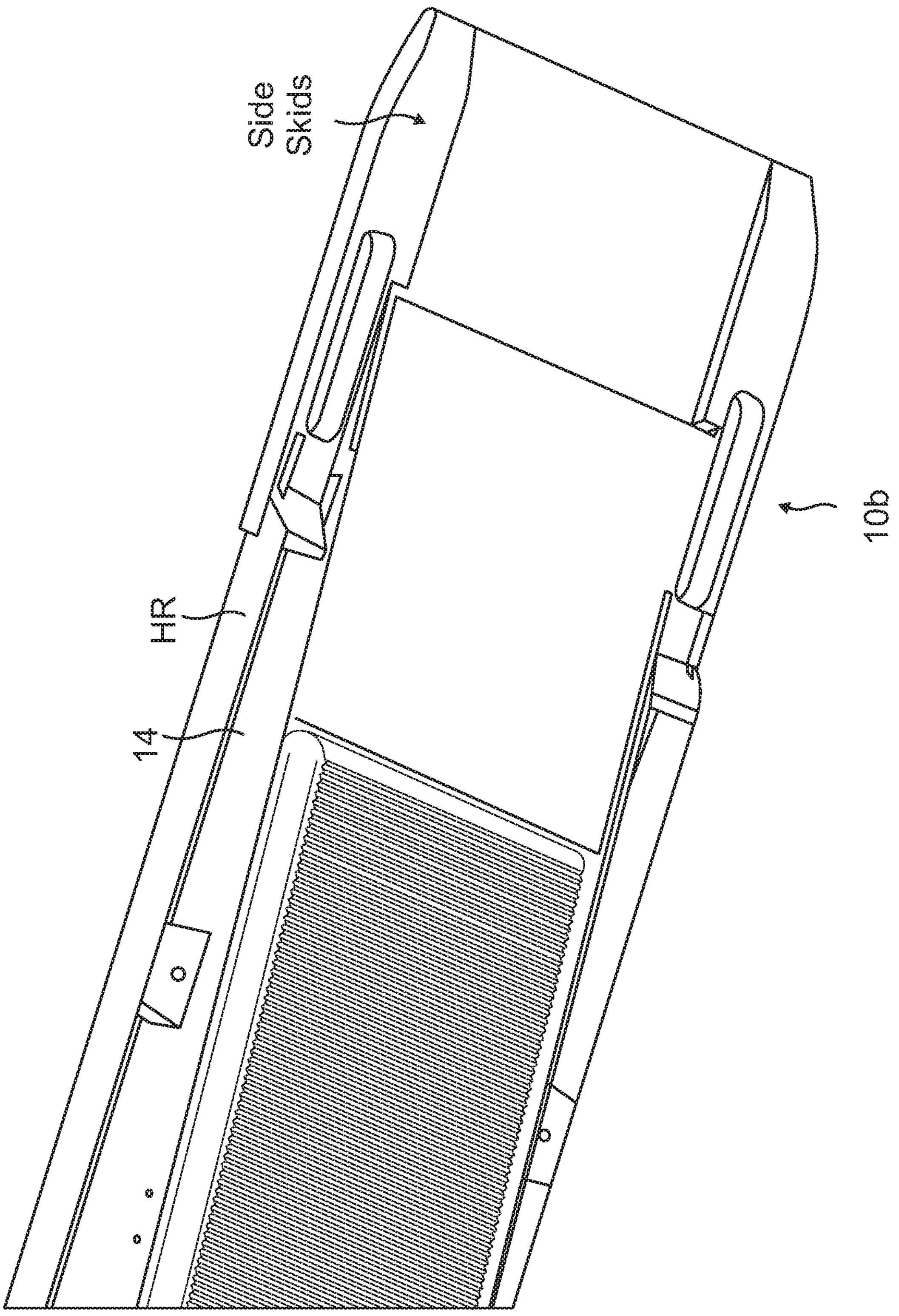
FIG. 11B is an enlarged, fragmentary, bottom end portion view of the embodiment of our transport apparatus shown in FIG. 7A.

One embodiment of a controller used in the transport apparatus 10*b* of FIG. 7A is illustrated in FIGS. 16 through 20 and generally designated by the numeral 19. This controller 19 has an open handle OH in its body B formed, for example, from a pair of molded plastic parts that, upon assembly, enclose a circuit board CB such as, for example, depicted in FIG. 19, which contains the circuits illustrated in the circuit diagram of FIG. 20 including a motor controller MC. Portions of the on/off power switch PSW, trigger T, and forward and reverse switch SW protrude from the body so the user can access and manually actuate these switches as required when using the controller 19.

Figure 12:
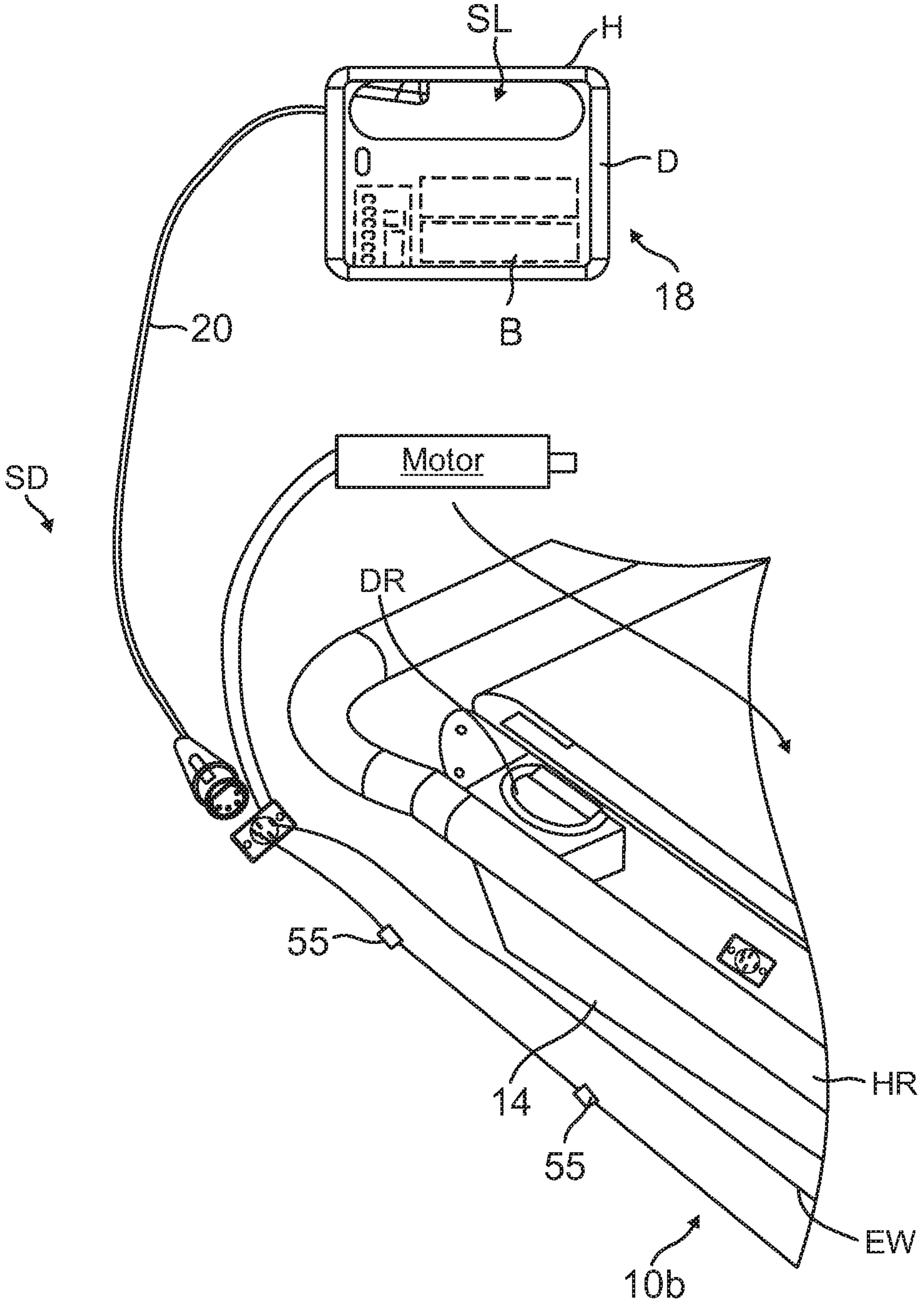
FIG. 12 is schematic view illustrating our transport apparatus shown in FIG. 7 being connected to the controller depicted in FIG. 5A.
Figure 16:
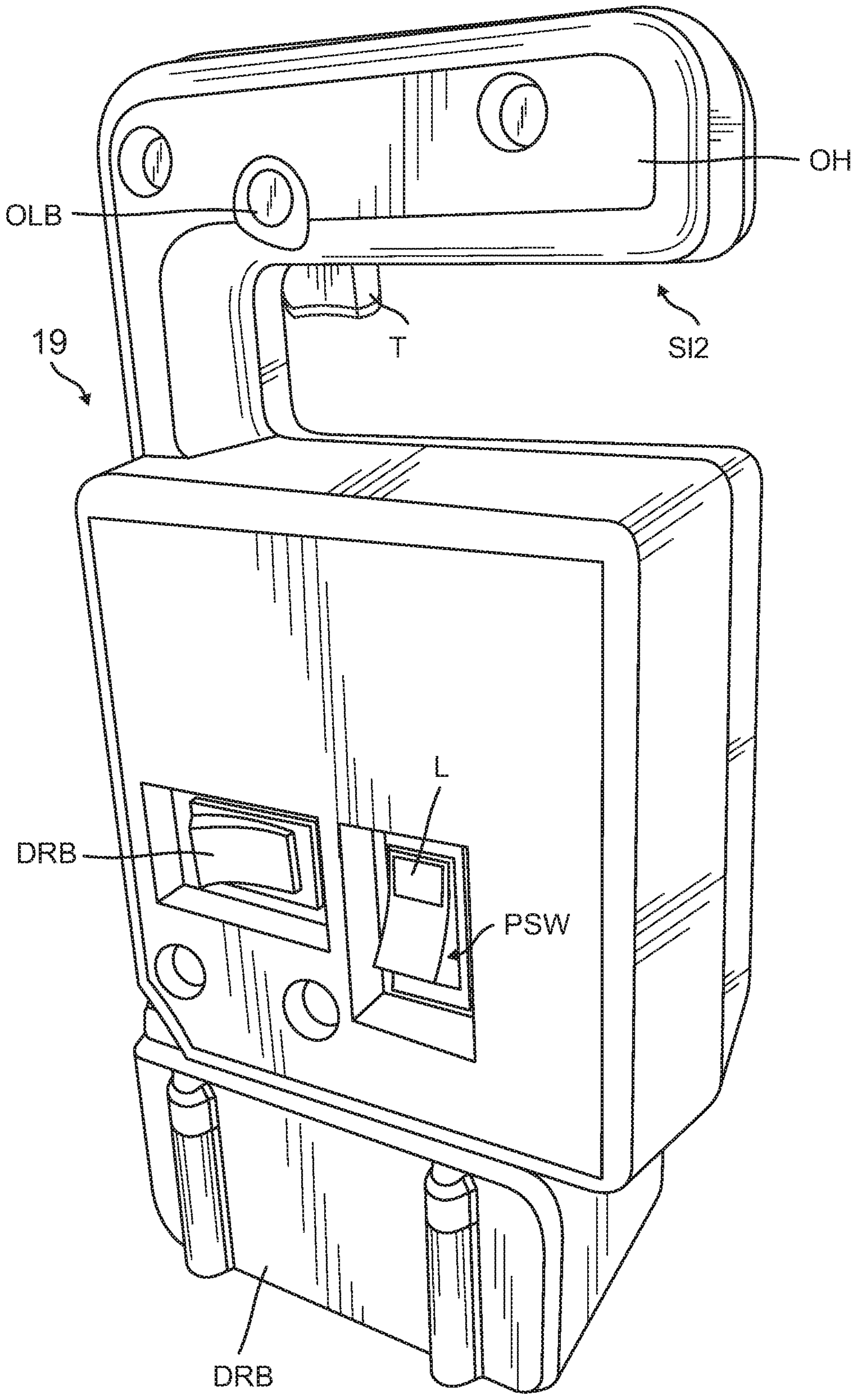
FIG. 16 is a front side perspective view of an alternate embodiment of a controller that may be used with our transport apparatus.
Figure 17:
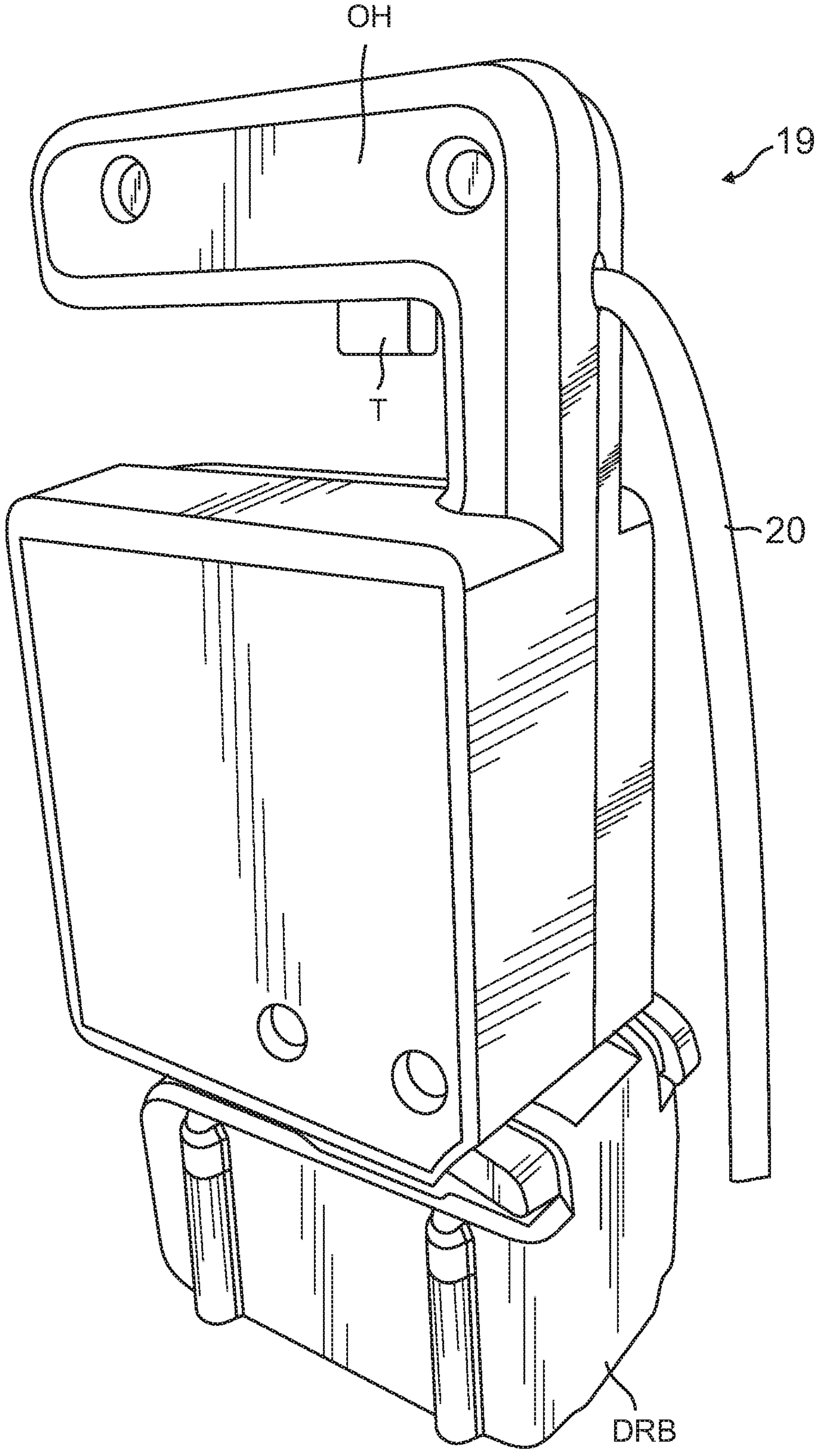
FIG. 17 is a rear perspective view of the controller shown in FIG. 16.
Figure 18:
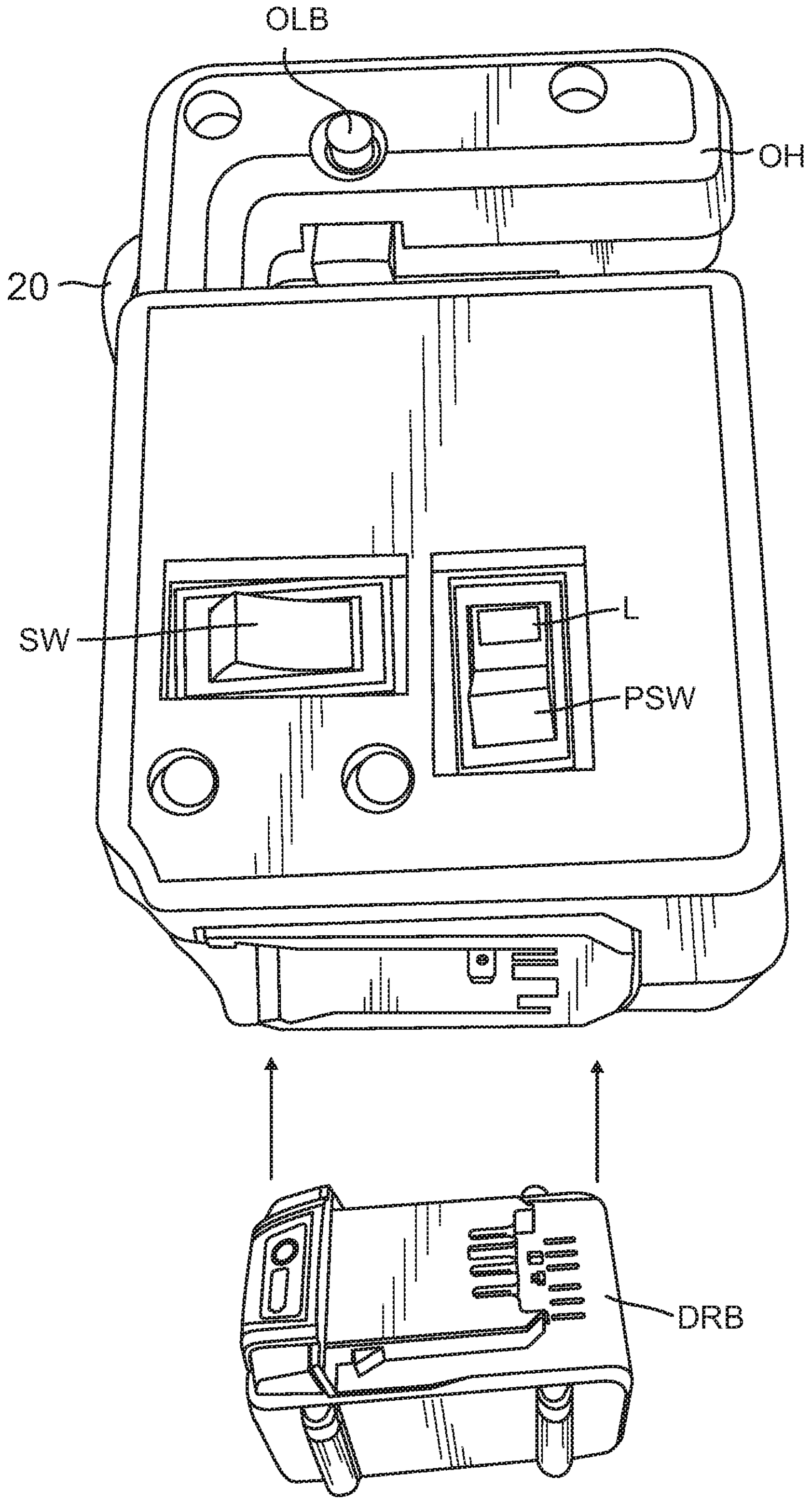
FIG. 18 is a front perspective view of the controller shown in FIG. 16 with its battery detached.
Figure 19:
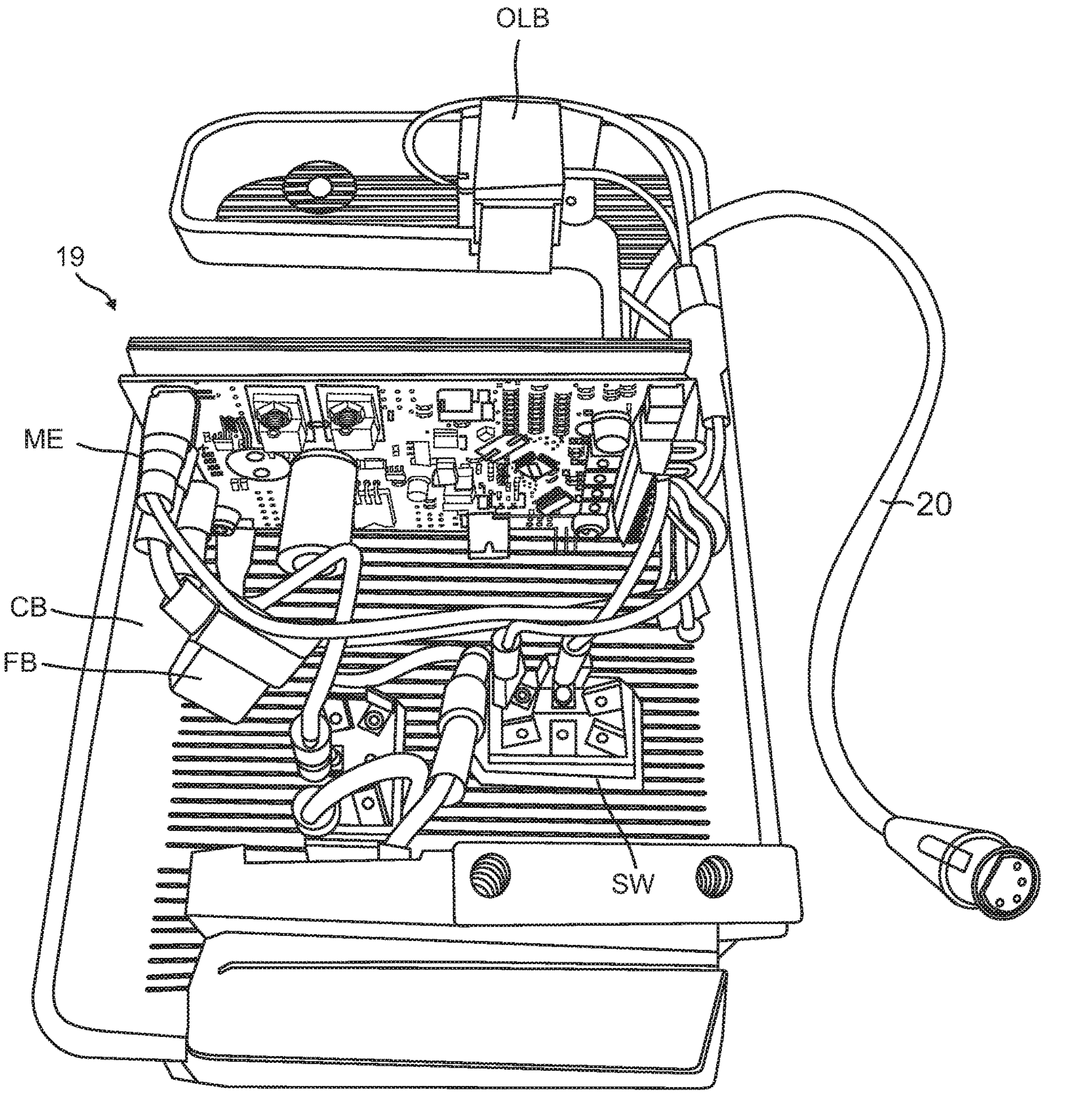
FIG. 19 is rear perspective view of the controller shown in FIG. 16 with its rear panel removed to exposed internal circuit components.
Figure 20:
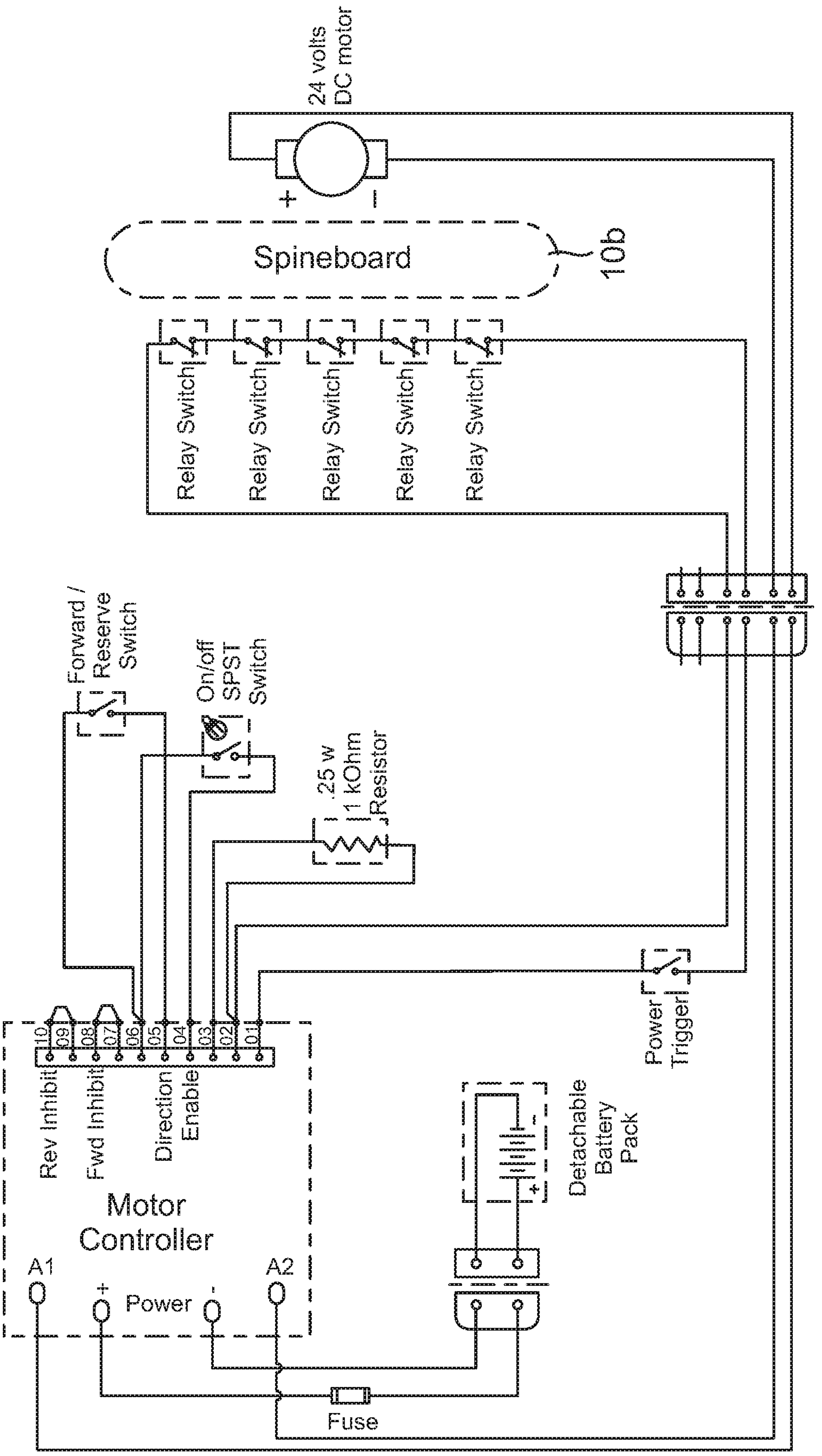
FIG. 20 is schematic diagram of a controller connecter to the transport apparatus shown in FIG. 7A.

As shown in FIGS. 12 and 16, the transport apparatus 10*b* is first connected to the controller 2 with a detachable rechargeable battery B electrically and mechanically connected to the circuit board CB. The on/off power switch PSW is first manually depressed to provide power and a light L is lit, indicating the controller 19 is activated. The user selects forward or reverse belt movement by actuating the forward and reverse switch SW. The transport apparatus 10*b* is aligned with the person to be transported as discussed above, and the user actuates an off-lock button OLB in the open handle OH nearby the trigger T, allowing a user to depress this button with his or her thumb while depressing the trigger with his or her index finger.

FIGS. 21 Through 31

Figure 26:
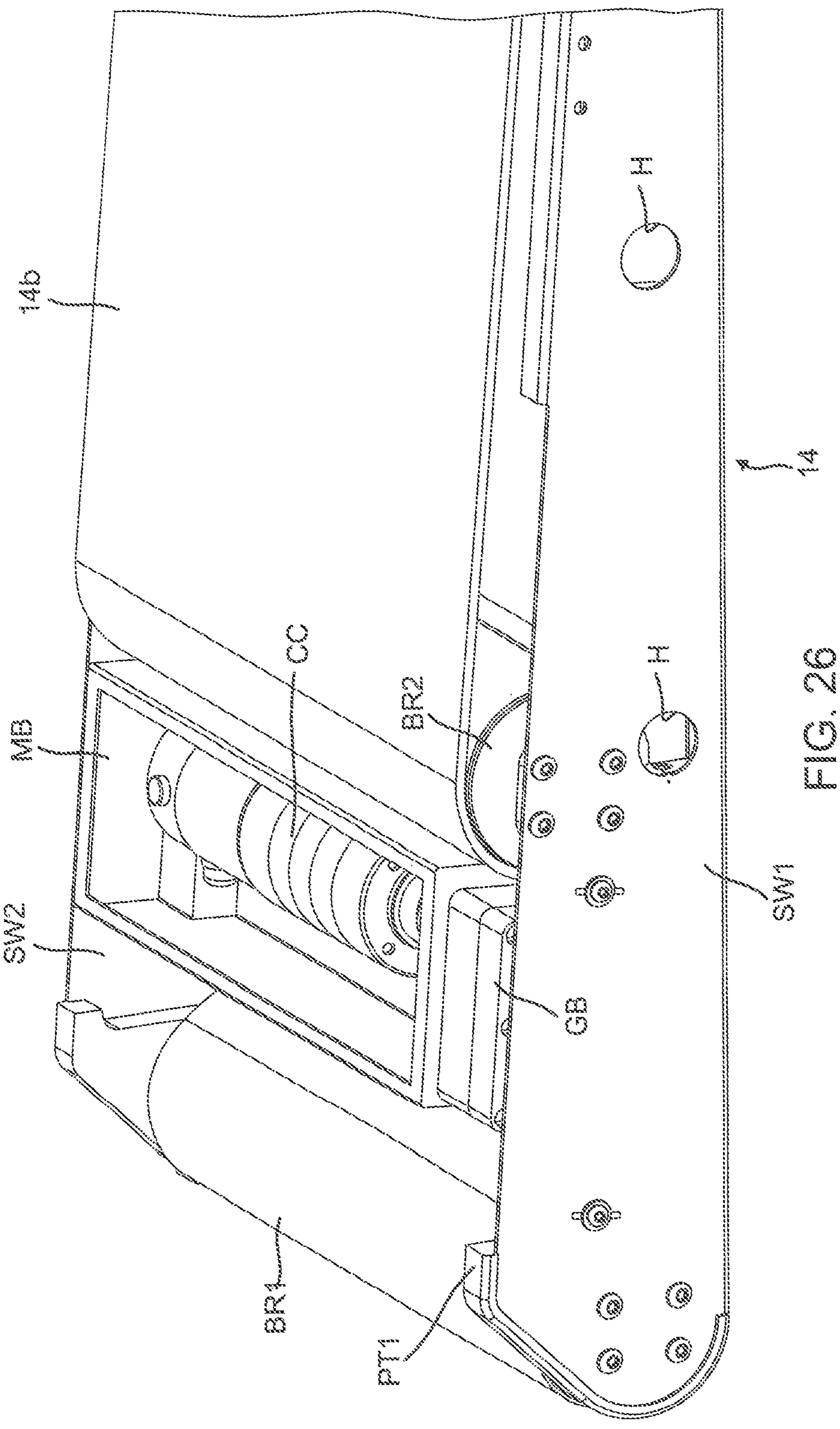

All conveyor-type belts need adjustment so that the belt remains centered and does not drift to the right or left as it moves along its path of travel. Belt tracking adjustment is different than belt tensioning adjustment, requiring separate mechanisms. In the embodiment of our transporting apparatus illustrated in FIGS. 21 through 31 and generally designated by the numeral 10*d*, the back end FE of the belt housing 14 and adjoining planar sides are shaped into an enlarged nose configuration. The forward end is tapered into a narrow front edge. As depicted in FIG. 26, a flat, planar, pulley sidewall SW1 and a flat, planar, non-pulley sidewall SW2 of the belt housing 14 support between them belt rollers BR1 and BR2 for belt tracking and tension rollers TR1 and TR2 for belt tensioning. The respective shafts of the belt rollers BR1 and BR2 and tension rollers TR1 and TR2 are at a right angle to the planar sidewalls SW1 and SW2. The belt pulley sidewall SW1 and a non-pulley sidewall SW2 are essentially of identically shaped, opposed, and parallel, being spaced apart a distance slightly greater than the width of the belts 14*a* and 14*b* that are of essentially the same width.

As the endless belts 14*a* and 14*b* advance along their respective upper and lower paths of travel, an adjustable alignment mechanism AAM (FIG. 23) maintains precisely these belts on their separate travel paths. It provides a fore-aft adjustment of the pulley shafts of +/−0.250 inch. This adjustability allows a user to easily and precisely square-up the drive pulleys P1 and P2 and account for normal manufacturing variation of the bends and punched mounting holes H in the belt housing 14 (FIG. 26). The belt rollers BR1 and BR2 and tension rollers TR1 and TR2 are at right angles to the sidewalls SW1 or SW2. The belt rollers BR1 and BR2 are mounted directly to the sidewalls SW1 or SW2. The tension rollers TR1 and TR2 are not mounted directly to the sidewalls SW1 or SW2. Rather each one of a pair of tension roller adjustment mechanisms TAM1 and TAM2 are fixedly attached, respectively, to the inside surfaces of the sidewalls SW1 and SW2. The tension rollers TR1 and TR2 engage the external surfaces of the belts 14*a* and 14*b* and apply a predetermined pressure against a portion of these external surfaces as the belts advance along their respective travel paths.

Figure 21:
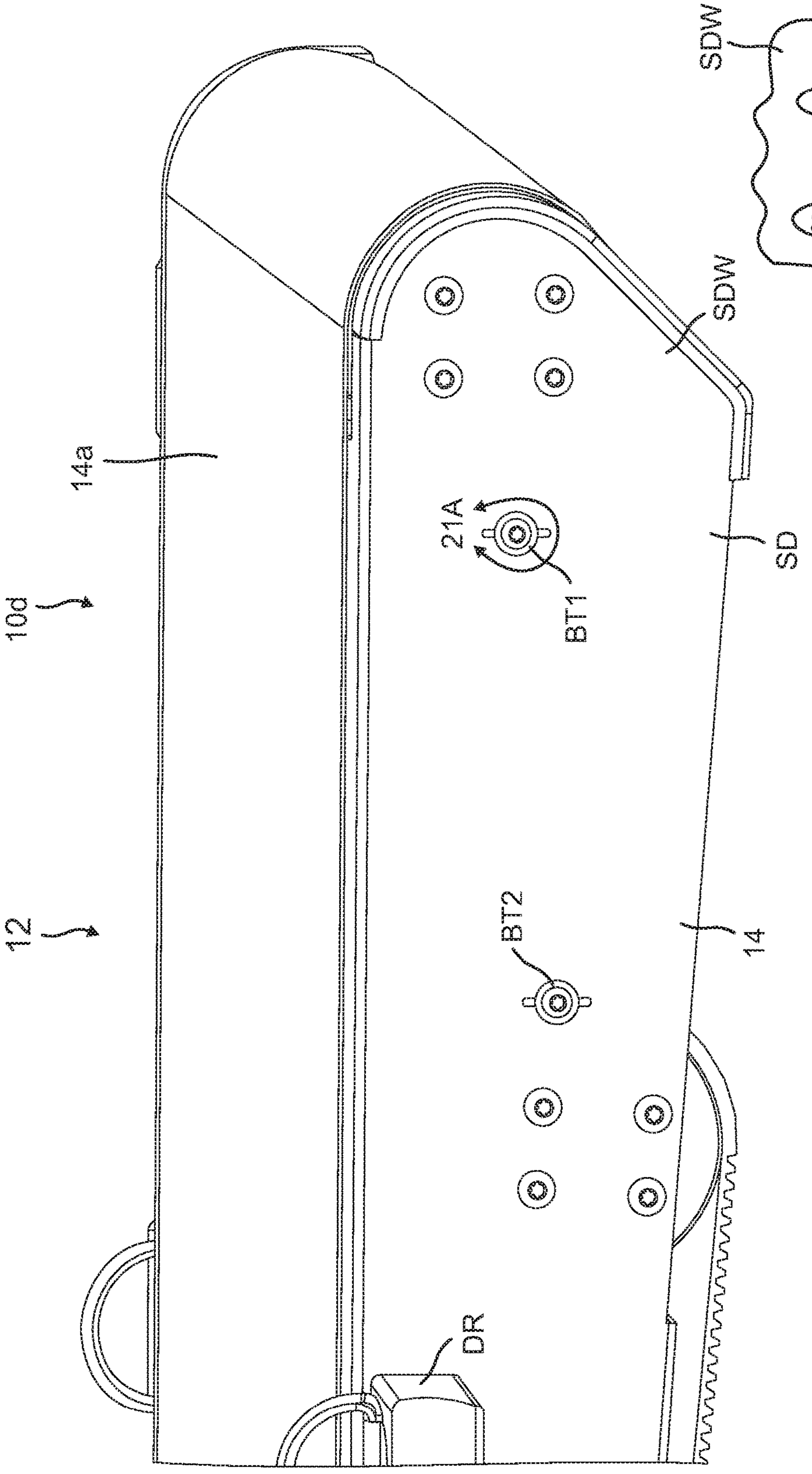
FIGS. 21 through 31 illustrate an embodiment of our transport apparatus having an adjustable alignment mechanism where.
Figure 21A:
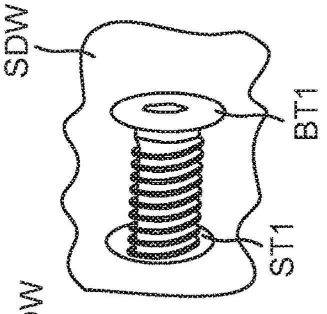
FIG. 21A is a fragmentary perspective view of the adjustment screw for changing belt tension.
Figure 22:
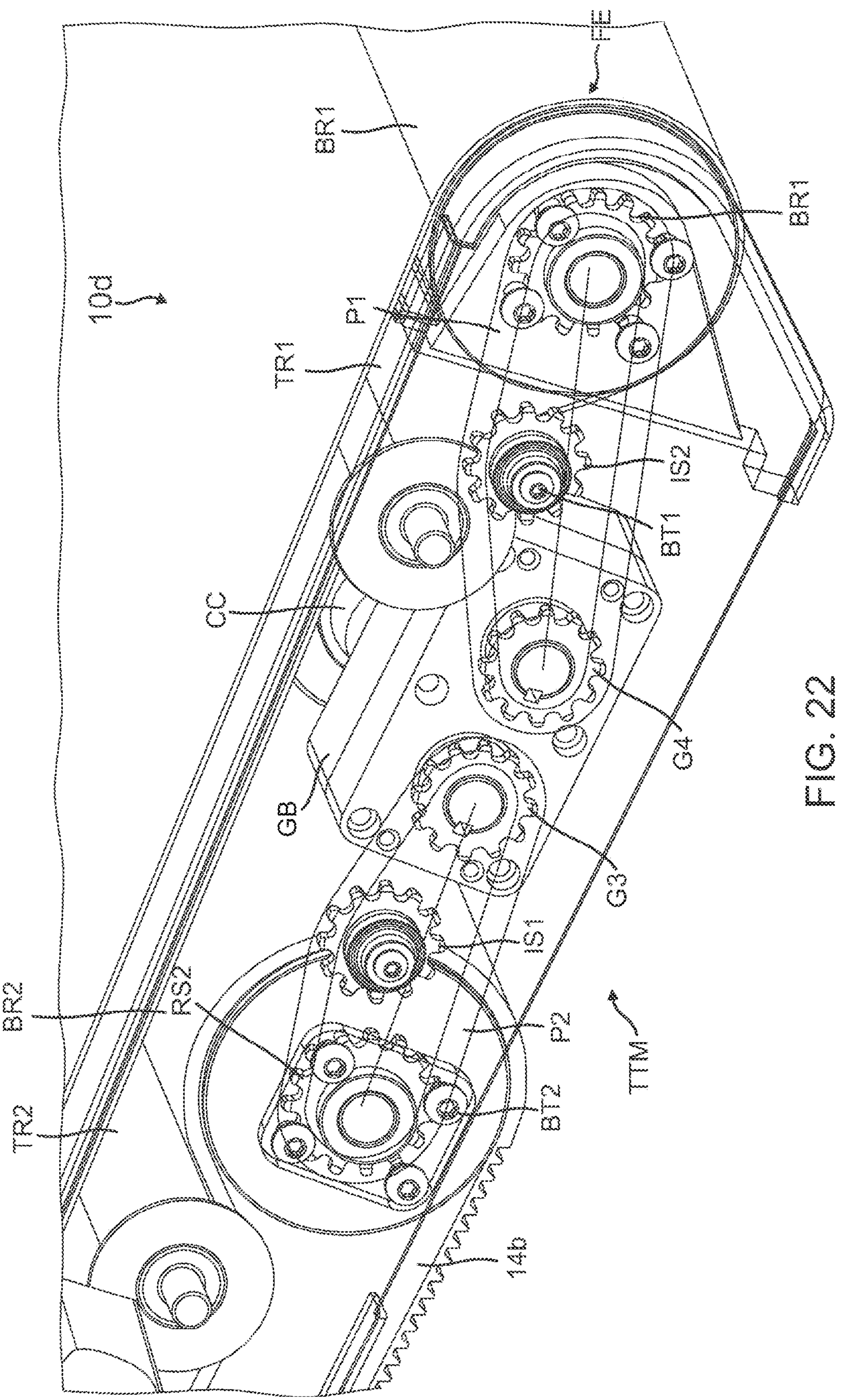
Figure 23:
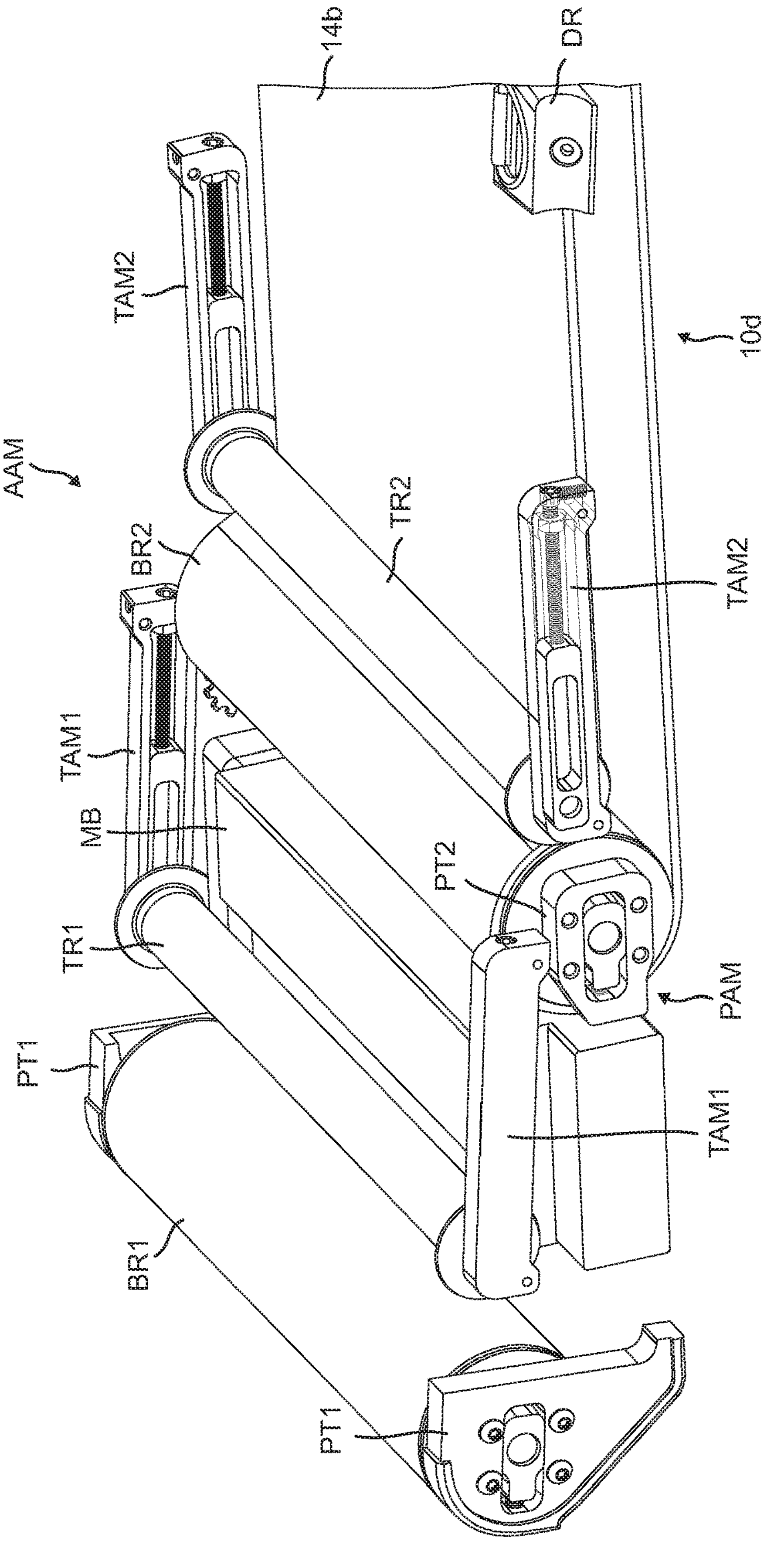
Figure 24:
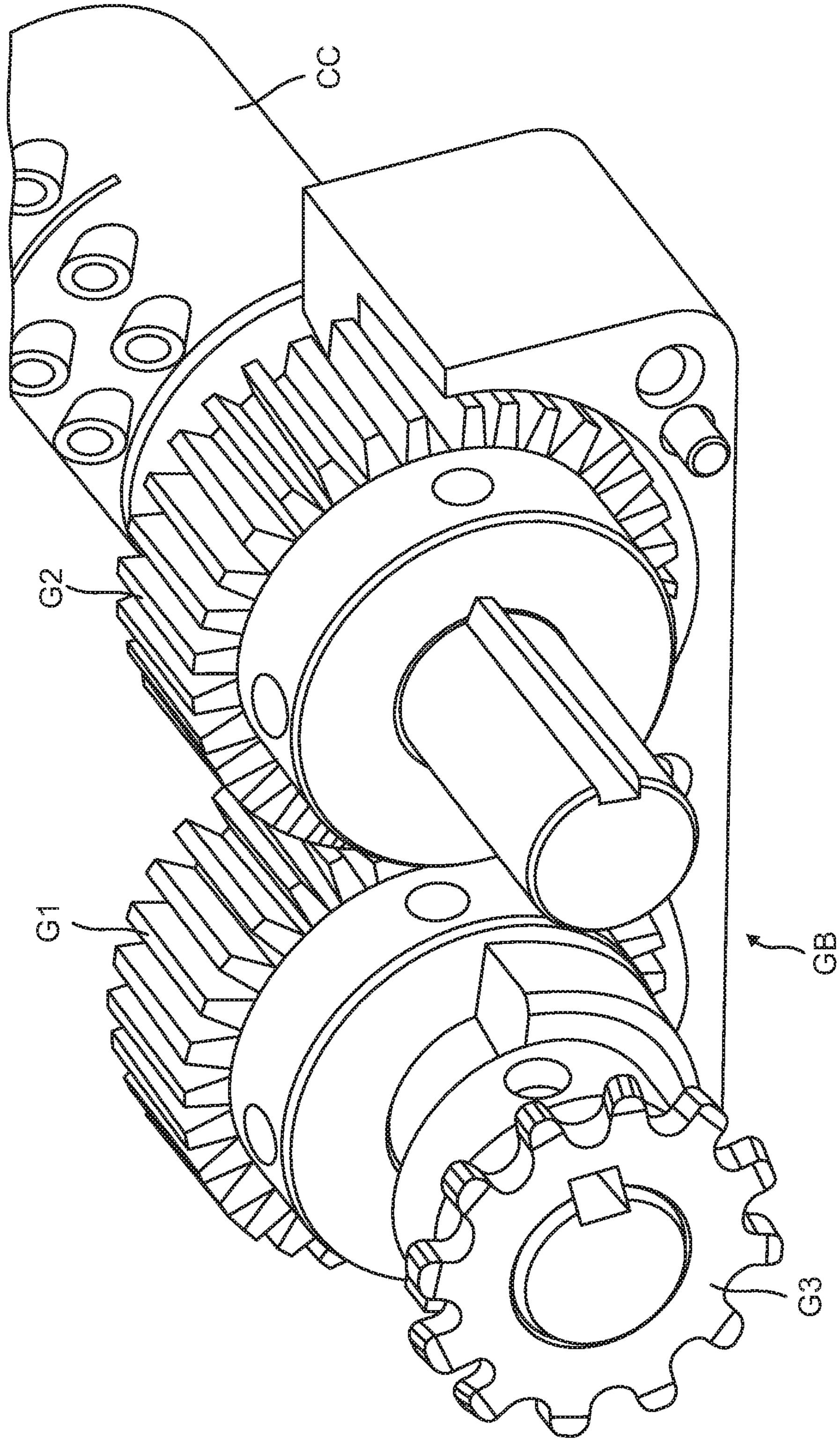
Figure 25:
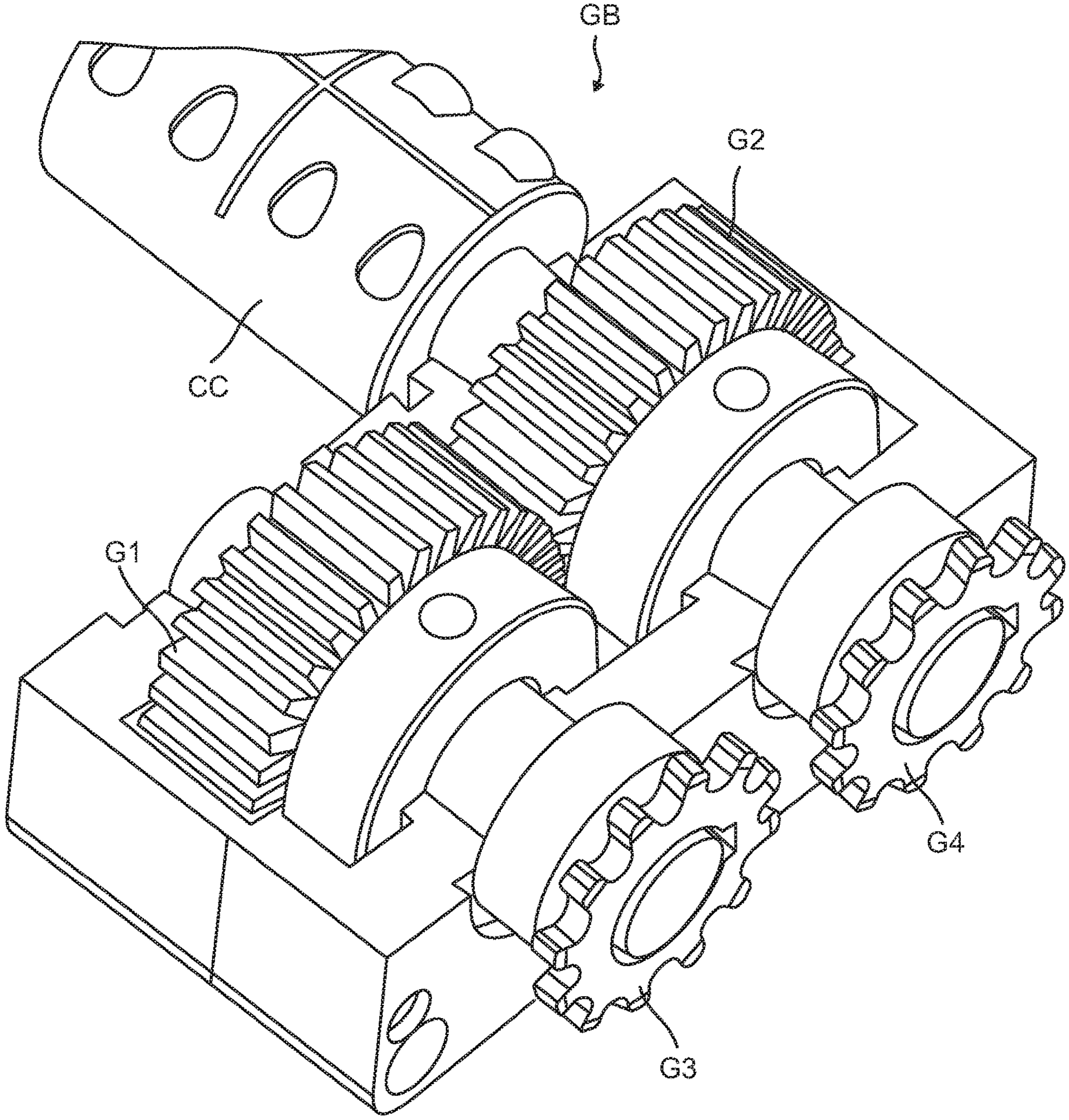

As depicted in FIG. 21, the pulley side of the transport apparatus 10*d* has the chain pulleys P1 and P2 mounted in a manner that minimizes side-to-side travel of the belts 14*a* and 14*b* as these belts advance along their respective paths through the transport apparatus. The adjustment alignment mechanism AAM as best shown in FIG. 23 includes a belt tensioning and tracking mechanism TTM (FIG. 30) that is mechanically coupled to and interactive with the apparatus' endless belts 14*a* and 14*b*. The endless belt 14*a* is partially wrapped around the belt roller BR1 that is mounted near the back end FE of the belt housing 14 to rotate and move this belt forward or reverse under the control of the forward and reverse switch SW. The 26 endless belt 14*b* is also partially wrapped around the belt roller BR2 that is mounted to the belt housing 14 to rotate and move this belt forward or reverse under the control of the forward and reverse switch SW. The belt rollers BR1 and BR2 and tension rollers TR1 and TR2 are all the same length equal to the distance between the sidewalls SW1 and SW2. There are elevated flanges F (FIG. 23) at the opposed ends of the tension rollers TR1 and TR2 that engage the edges ED (FIG. 28) of the belts 14*a* and 14*b*. The opposed axial ends of the shafts of the belt rollers BR1 and BR2 are mounted in roller bearings to rotate either clockwise or counter-clockwise.

A pair of identically shaped opposed rigid mounting plates PT1, each one of the pair along the inside surfaces of the opposed sidewalls SW1 and SW2, hold the shaft ends of the belt roller BR1 at right angle to the sidewalls SW1 and SW2. These rigid plates PT1 and PT2 each have a pair of easy access, spring-loaded adjustment mechanisms MY1 and MY2 that enable a user to manually readjust roller positions. Each of the mounting plates PT1 are in fixed positions and each having an inside surfaces, and these surfaces face each other. Only the terminal end of the shaft of the belt roller BR1 on the non-pulley side of our transport apparatus, and only this side, has the spring-loaded adjustment mechanism MY1 attached to it. This adjustment mechanism MY1 enables a user to move this terminal end of the belt roller BR1 fore and aft. A rigid mounting plate PT2, also along the inside surface of the sidewall SW1, and rearward of the one plate PT1, holds the terminal shaft end of the belt roller BR2 so that a user can manually move fore and aft the belt roller BR2. The belt roller BR2 is at right angle to the sidewalls SW1 and SW2 and mounted in roller bearings. The mounting plate PT2 is in a fixed positioned attached to the sidewall SW1.

The axles of the drive pulleys P1 and P2 are squared, flush and at right angles to the sidewalls SW1 and SW2 of the belt housing 14. As little as 0.010 inch of misalignment on one side can cause a belt to drift to one side. Consequently, readjustment is required from time to time. Loosening the axle mounts and manually shifting them by a very small amount, under belt tension, is difficult and would be challenging to repeat during production. Using our adjustable alignment mechanism AAM, an easy to access screw mechanism, there are holes H (FIG. 26) in the sidewalls SW1 and SW2 to allow a user using a hex wrench to access and manually move yoke members Y1 (FIG. 29) or Y2 (FIG. 31), as the case may be, to readjust tension and tracking when required. As shown best in FIG. 30, the plates PT1 and PT2 are in fixed positions. The plate PT1 is shaped to integrate with the forward end FE of the housing 14, and it comprises a machined aluminum sheet that provides a solid end structure to resist impacts, and also eliminate any sharp edges where the belt housing 14 ends.

Figure 29:
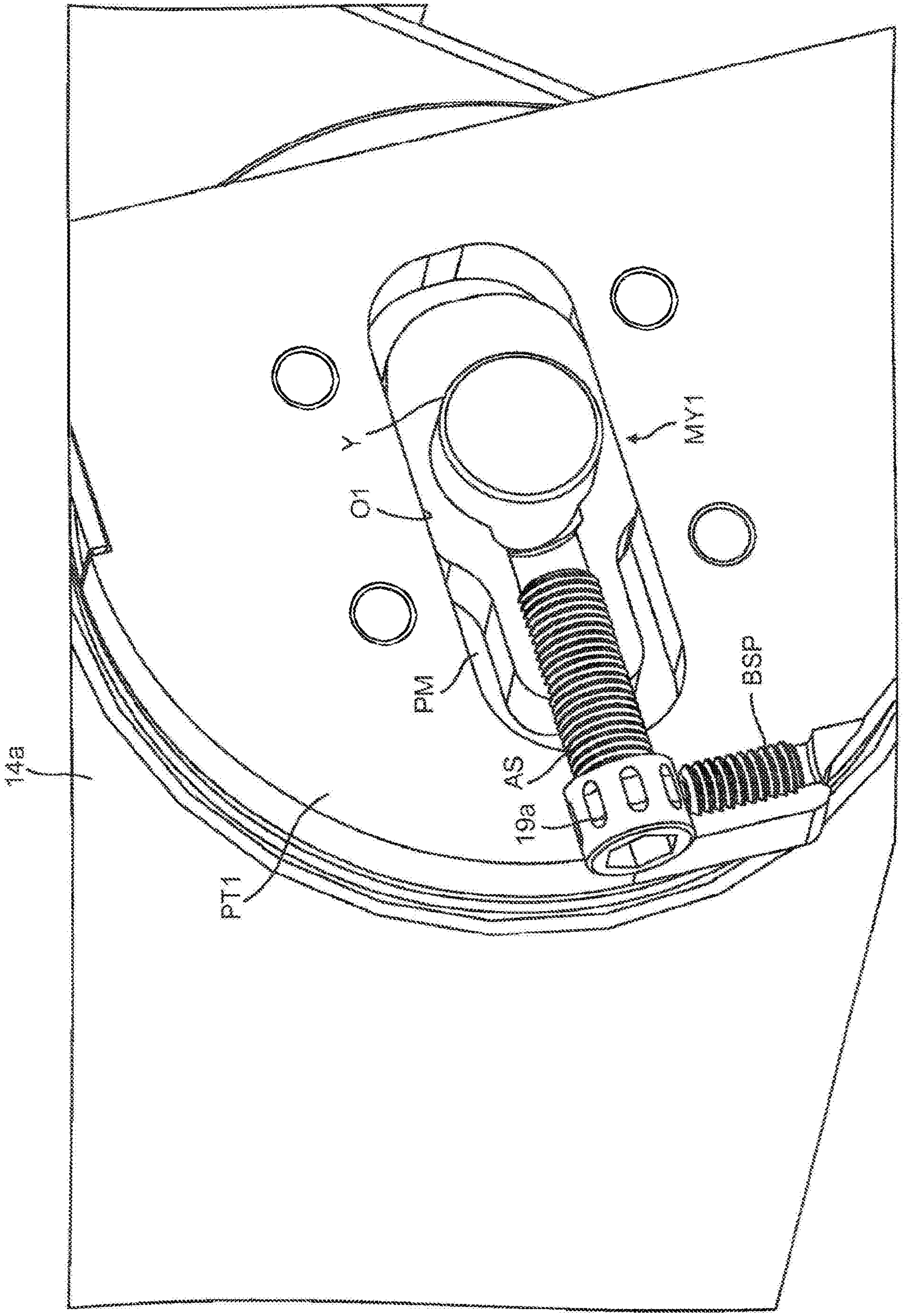
Figure 30:
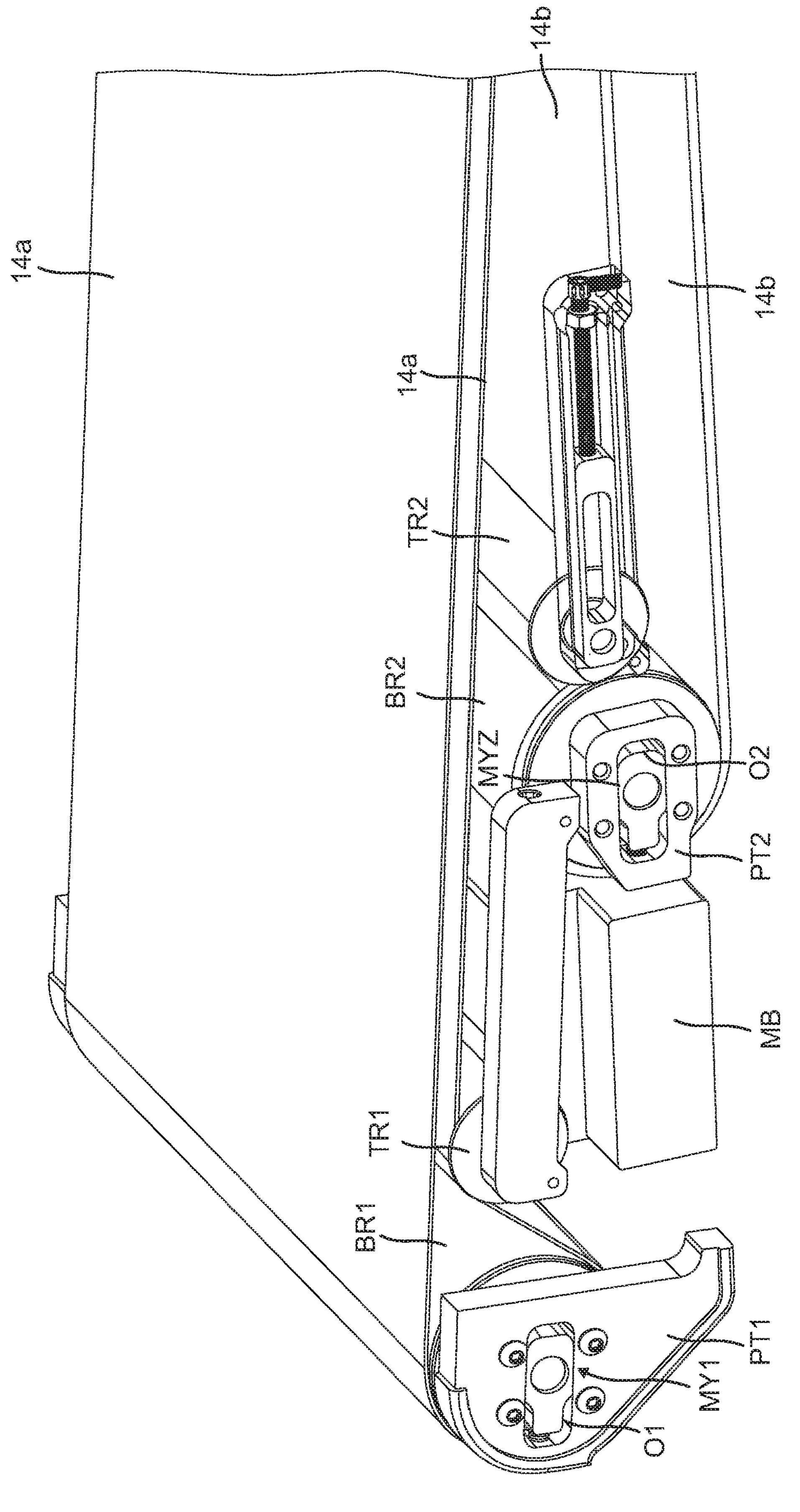
Figure 31:
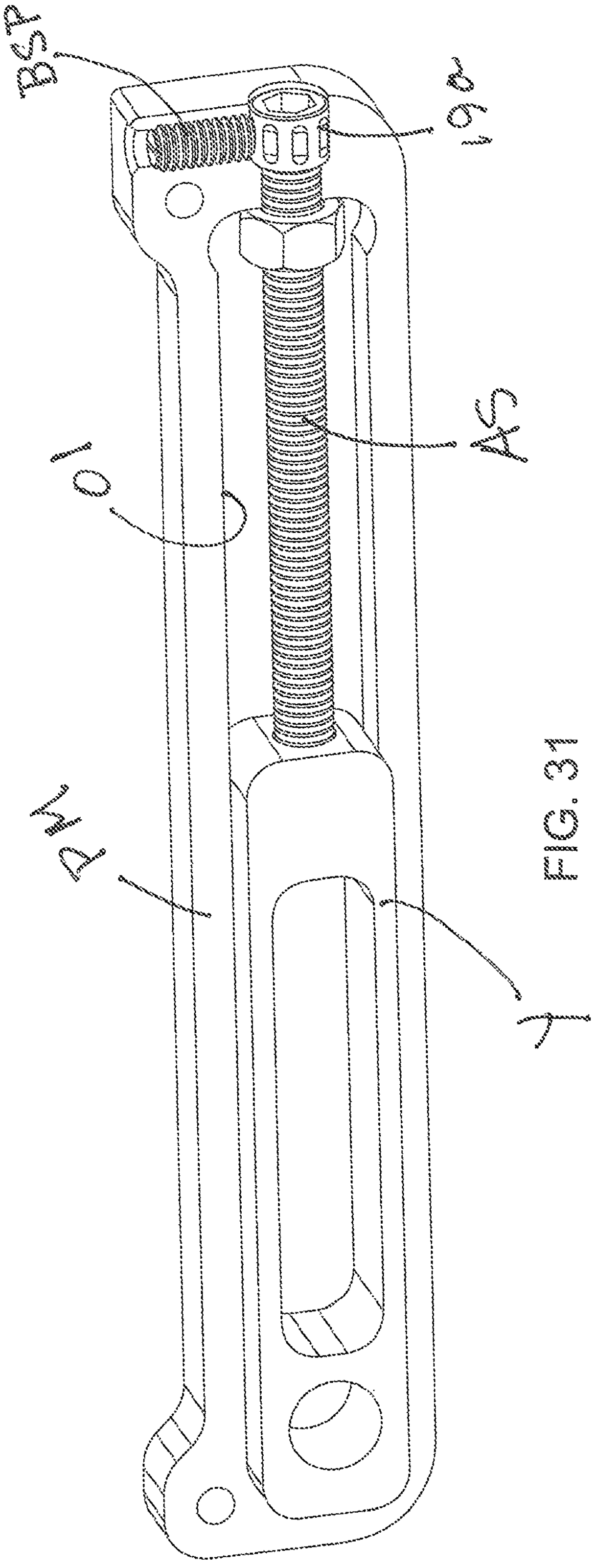

As shown best in FIGS. 29 and 31, the adjustment mechanism MY1 and adjustment mechanism MY2 and tension roller adjustment mechanisms TAM1 and TAM2, each have in the plate members PM having an elongated opening 01 in which a yoke Y that sides fore and aft within this opening. An adjustment screw AS having a head with eight detents (grooves) 19*a* machined into it keeps the screw from turning on its own. There is a ball spring plunger BSP engaging the adjustment screw AS that upon rotating move the head to reposition the detents and generate a click sound, lock into the selected position. This results in approximately 0.007 inch of fore-aft pulley shaft movement (tightening or loosening), per click (⅛ turn of the screw). In order to adjust belt tracking, the adjustment screw AS is the only thing that needs to be touched. No other screws will need to be loosened or tightened. The adjustment screw AS does not need a jam nut or lock nut because the spring-loaded plunger keeps the screw from turning in either direction.

Belt tension adjustment relies on moving the position of the tension rollers TR1 and TR2. The main purpose of the tension rollers TR1 and TR2 is to increase the amount that the belt wraps around the drive pulley in order to improve belt-to-pulley traction. In our case, we are using the tension rollers TR1 and TR as belt tension adjusters too. Note that the tension rollers TR1 and TR2 have flanges F to help to center the belts. Most of the belt tracking must be taken care of by using the tracking adjusters as described earlier. These flanges F will quickly wear out a belt along its edges if the belt tracking is significantly off. Like the tension roller adjustment mechanisms TAM1 and TAM2 discussed above, adjustment of the belt tension is made by simply turning the adjustment screw AS using a hex wrench. No other screws need to be loosened or tightened. Because the adjusters are buried deep into the crowded belt housing four 1.375 inch diameter access holes in the side of the belt housing 14 allow for adjustment of the belt tension. These holes will allow an inch drive ratchet wrench to enter for quick tension adjustments. The access holes will be plugged with semi-permanent plastic caps. 18

Scope of the Invention

The above presents a description of the best mode we contemplate of carrying out our apparatus for transport a person and method, and of the manner and process of making and using them, in such full, clear, concise, and exact terms as to enable a person skilled in the art to make and use. Our apparatus for transport a person and method is, however, susceptible to modifications and alternate constructions from the illustrative embodiment discussed above which are fully equivalent. Consequently, it is not the intention to limit our apparatus for transport a person and method to the particular embodiment disclosed. On the contrary, our intention is to cover all modifications and alternate constructions coming within the spirit and scope of our apparatus for transport a person and method as generally expressed by the following claims, which particularly point out and distinctly claim the subject matter of my our invention.

The invention claimed is:

1. An apparatus for transporting a person from a position lying on the ground onto said apparatus generally in a horizontal orientation, said apparatus comprising a board assembly upon which the person is positioned in a horizontal orientation, said board assembly including a belt housing for first and second endless belts with the first belt beneath the second belt, a drive system for rotating the first and second endless belts in opposite directions simultaneously and including a battery powered motor having a motor coupling, said first belt upon actuation of the motor advancing the apparatus towards said person on the ground with a portion of said first belt engaging the ground, and said second belt having a portion engaging the person and moving the person onto said second belt upon actuation of the motor, and a hand-held, portable, external, detachable controller including a controller housing retaining an external battery, and a cable extending outward from said controller housing, said cable terminating in a cable coupling configured to be manually connected and disconnected to the motor coupling, wherein the battery powered motor is electrically connected to the external battery retained in the controller housing via the cable when the cable coupling in the controller is connected to the motor coupling in the board assembly, wherein the apparatus further comprises a safety device that prevents operation of the apparatus until the safety device is disabled, where the safety device includes a plurality of switches in an electrical series connection, wherein each of the plurality of switches in the electrical series connection comprises a D-ring, wherein a D-ring being in a down position continues the electrical series connection and the D-ring being in an up position breaks the electrical series connection, wherein the D-ring is in the up position when a strap holding the person to the board loops through the D-ring.

2. The apparatus of claim 1 including a gear assembly within the belt housing and operably connected to the motor and belts so that, with the apparatus on the ground and longitudinally aligned with the person being transported, actuation of the motor advances the apparatus towards said person.

3. The apparatus of claim 2 including a handrail attached to the belt housing that facilitates lifting the apparatus off the ground with the person thereon in a horizontal orientation.

4. The apparatus of claim 3 including straps attached to the housing for holding the person securely on the apparatus.

5. The apparatus of claim 1 having a weight less than 100 pounds not including the weight of the detachable controller.

6. The apparatus of claim 1 where the controller has a weight less than 12 pounds.

7. The apparatus of claim 1 including a device that provides a tracking signal for remotely locating said apparatus.

8. The apparatus of claim 7 where the tracking device is interactive with a mobile device equipped with an application for locating said device.

9. The apparatus of claim 1 including a smart technology diagnostic module that monitors a patient placed on said apparatus.

10. The apparatus of claim 1 including a drive pulley system within the belt housing.

11. The apparatus of claim 1 including a drive gear system within the belt housing.

12. An apparatus for transporting a person from a horizontal and longitudinal orientation lying on the ground onto said apparatus generally in the same horizontal and longitudinal orientation, said apparatus comprising a board assembly upon which the person is positioned including a belt housing for first and second endless belts with the first belt beneath the second belt, a drive system for rotating the first and second endless belts in opposite directions simultaneously and including a motor having a motor coupling, said first belt upon actuation of the motor advancing the apparatus towards said person on the ground with a portion of said first belt engaging the ground, and said second belt having a portion engaging the person and moving the person onto said second belt upon actuation of the motor, and a hand-held, portable, external, detachable controller including a controller housing retaining an external battery, a cable extending outward from said controller housing, said cable terminating in a cable coupling configured to be manually connected and disconnected to the motor coupling, wherein the battery powered motor is electrically connected to the external battery retained in the controller housing via the cable when the cable coupling in the controller is connected to the motor coupling in the board assembly, a belt tensioning mechanism within the belt housing that is mechanically coupled to the belts, and a safety device that prevents operation of the apparatus until the safety device is disabled, where the safety device includes a plurality of switches in an electrical series connection, wherein each of the plurality of switches in the electrical series connection comprises a D-ring, wherein a D-ring being in a down position continues the electrical series connection and the D-ring being in an up position breaks the electrical series connection, wherein the D-ring is in the up position when a strap holding the person to the board loops through the D-ring.

13. An apparatus for transporting a person from a horizontal and longitudinal orientation lying on the ground onto said apparatus generally in the same horizontal and longitudinal orientation, said apparatus comprising a board assembly upon which the person is positioned including a belt housing for first and second endless belts with the first belt beneath the second belt, a drive system for rotating the first and second endless belts in opposite directions simultaneously and including a motor having a motor coupling, said first belt upon actuation of the motor advancing the apparatus towards said person on the ground with a portion of said first belt engaging the ground, and said second belt having a portion engaging the person and moving the person onto said second belt upon actuation of the motor, and a hand-held, portable, external, detachable controller including a controller housing retaining an external battery, a cable extending outward from said controller housing, said cable terminating in a cable coupling configured to be manually connected and disconnected to the motor coupling, wherein the battery powered motor is electrically connected to the external battery retained in the controller housing via the cable when the cable coupling in the controller is connected to the motor coupling in the board assembly, a belt tracking mechanism within the belt housing that is mechanically coupled to the belts, and a safety device that prevents operation of the apparatus until the safety device is disabled, where the safety device includes a plurality of switches in an electrical series connection, wherein each of the plurality of switches in the electrical series connection comprises a D-ring, wherein a D-ring being in a down position continues the electrical series connection and the D-ring being in an up position breaks the electrical series connection, wherein the D-ring is in the up position when a strap holding the person to the board loops through the D-ring.

14. An apparatus for transporting a person from a horizontal and longitudinal orientation lying on the ground onto said apparatus generally in the same horizontal and longitudinal orientation, said apparatus comprising a board assembly upon which the person is positioned in said horizontal and longitudinal orientation and a hand-held, portable, external controller, said board assembly having a housing supporting a drive belt assembly comprising a drive system for rotating at least one endless belt that moves over an exterior support surface of the housing to support said person being moved onto said apparatus, an adjustable alignment mechanism that is mechanically coupled to said endless belt, and a safety device that prevents operation of the apparatus until the safety device is disabled, said board assembly and controller configured to be connected together and disconnected via a cable extending outward from the controller, said cable terminating in a cable coupling that is configured to be manually connected to a motor coupling in said board assembly, to electrically couple and decouple a battery within the controller to a drive motor for the drive system, wherein the apparatus further comprises a safety device that prevents operation of the apparatus until the safety device is disabled, where the safety device includes a plurality of switches in an electrical series connection, wherein each of the plurality of switches in the electrical series connection comprises a D-ring, wherein a D-ring being in a down position continues the electrical series connection and the D-ring being in an up position breaks the electrical series connection, wherein the D-ring is in the up position when a strap holding the person to the board loops through the D-ring.

15. The apparatus of claim 14 where the weight of the board assembly is less than 55 pounds not including the weight of the detachable controller, and the controller has a weight less than 12 pounds not including the battery.

16. An apparatus for transporting a person from a horizontal and longitudinal orientation lying on the ground onto said apparatus generally in the same horizontal and longitudinal orientation, said apparatus comprising (i) a board assembly upon which the person is positioned in said horizontal and longitudinal orientation and (ii) a hand-held, portable, external controller configured to be attached and detached to the board assembly, said board assembly and controller configured to be connected together and disconnected via a cable extending outward from the controller, said cable terminating in a cable coupling that is configured to be manually connected to a motor coupling in said board assembly, to electrically couple and decouple a battery within the controller to a drive motor for a drive system for the apparatus, said board assembly having a housing containing at least one endless belt mounted to advance along a predetermined endless path, said drive system for advancing the endless belt along said path, and an adjustable alignment mechanism that maintains the belt on the path as said belt advances along said path, said belt having a portion continuously moving over an exterior surface of the housing to support a person being carried by the belt as said belt advances along said path, and said apparatus having a forward end configured to support the person as he/she is being moved from the ground onto said portion of the endless belt moving over said exterior support surface, wherein the apparatus further comprises a safety device that prevents operation of the apparatus until the safety device is disabled, where the safety device includes a plurality of switches in an electrical series connection, wherein each of the plurality of switches in the electrical series connection comprises a D-ring, wherein a D-ring being in a down position continues the electrical series connection and the D-ring being in an up position breaks the electrical series connection, wherein the D-ring is in the up position when a strap holding the person to the board loops through the D-ring.

17. The apparatus of claim 16 where said drive system and adjustable alignment mechanism are mechanically coupled together to control tension in the belt and configured to set, interact and maintain centering of the belt as said belt advances along said path.

18. The apparatus of claim 17 including an adjustment mechanism that enables a user from time to time make manual adjustments in the tension and tracking of the belt.

19. The apparatus of claim 18 including a safety device that prevents operation of the apparatus until the safety device is disabled.

20. The apparatus of claim 19 where the belt is mounted to move in either a clockwise or counter-clockwise direction along said path, and the apparatus includes a switch for selecting either clockwise or counter-clockwise directional movement, and upon use of the apparatus the belt advances in one direction to move the apparatus towards the person and in the other opposite direction away from the person.

21. A method of transporting a person from a position on the ground onto an apparatus generally in a horizontal orientation, said apparatus including a drive system for first and second endless belts, said method comprising the steps of (a) aligning the apparatus lengthwise with a person to be transported lying lengthwise on the ground in a generally horizontal orientation, (b) placing an end of the apparatus adjacent to the head or feet of said person, (c) providing a hand-held, portable, external, detachable controller including a battery that powers a motor for a belt drive system that upon actuation of the motor moves the person from the ground onto the apparatus, (d) placing each of a plurality of D-rings in a down position to continue an electrical series connection between each of the plurality of D-rings, (e) manually coupling the battery to the motor by coupling a cable coupling on a cable extending outwardly from the controller with a motor coupling in the apparatus and manually actuating the controller to operate the motor, advancing the apparatus towards said person and moving said person onto the apparatus, (f) discontinuing actuation of the controller to stop the operation of the motor when the person is on the apparatus in a generally horizontal orientation, and (g) looping a strap holding the person to the board loops through each of the plurality of D-rings to place each of the plurality of D-rings in an up position to break the electrical series connection between each of the plurality of D-rings to act as a safety device.

22. The method of claim 21 where the apparatus has a weight less than 55 pounds not including the weight of the detachable controller.

23. The method of claim 22 where the controller has a weight less than 12 pounds not including the battery.

24. The method of claim 21 where the motor is within a belt housing.

25. The method of claim 21 where, with a person on the apparatus, the operation of the motor is reversed to unload said person.

* * * * *